(12) United States Patent
Shutov et al.

(10) Patent No.: US 8,680,211 B2
(45) Date of Patent: Mar. 25, 2014

(54) HYBRID POLYESTER-POLYETHER POLYOLS

(75) Inventors: Pavel L. Shutov, Linz (AT); Jorge Jimenez, Lake Jackson, TX (US); Hanno R. Van der Wal, Hoek (NL); Francois M. Casati, Pfaffikon (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/640,429

(22) PCT Filed: Apr. 21, 2011

(86) PCT No.: PCT/US2011/033346
§ 371 (c)(1),
(2), (4) Date: Oct. 10, 2012

(87) PCT Pub. No.: WO2011/137011
PCT Pub. Date: Nov. 3, 2011

(65) Prior Publication Data
US 2013/0035467 A1 Feb. 7, 2013

Related U.S. Application Data

(60) Provisional application No. 61/329,219, filed on Apr. 29, 2010, provisional application No. 61/453,152, filed on Mar. 16, 2011.

(51) Int. Cl.
*C08G 65/32* (2006.01)

(52) U.S. Cl.
USPC ........... 525/408; 525/438; 525/439; 528/365; 528/366; 528/405; 528/408; 528/409; 528/421

(58) Field of Classification Search
USPC ......... 528/297, 301, 365, 366, 405, 408, 409, 528/421; 525/408, 438, 449
See application file for complete search history.

(56) References Cited

U.S. PATENT DOCUMENTS

| | | | | |
|---|---|---|---|---|
| 3,459,733 A | * | 8/1969 | Byrd, Jr. et al. | 536/18.2 |
| 4,701,477 A | * | 10/1987 | Altenberg et al. | 521/167 |
| 4,707,535 A | * | 11/1987 | Koleske | 528/110 |
| 4,845,266 A | * | 7/1989 | Marx et al. | 560/91 |
| 6,753,402 B1 | * | 6/2004 | Bauer et al. | 528/76 |

FOREIGN PATENT DOCUMENTS

| | | | | |
|---|---|---|---|---|
| AU | 538363 B2 | * | 8/1981 | C07C 41/03 |
| EP | 0409599 A2 | * | 7/1990 | C08G 65/26 |
| WO | WO2005049748 A1 | * | 6/2005 | C09D 175/14 |

* cited by examiner

*Primary Examiner* — Robert Jones, Jr.

(57) ABSTRACT

A process for preparing a hybrid polyester-polyether polyol comprises contacting a carboxyl group-containing component and an epoxide, optionally in the presence of one or more of a double metal cyanide catalyst, a superacid catalyst, a metal salt of a superacid catalyst and/or a tertiary amine catalyst, under conditions such that a hybrid polyester-polyether polyol is formed. The hybrid polyester-polyether polyol offers the advantages of both ester and ether functionalities when used in a polyurethane formulation, thus enhancing physical properties. The process results in products having narrow polydispersity, a low acid number and unsaturation, and reduced byproduct formation, particularly when the double metal cyanide catalyst is employed.

8 Claims, No Drawings

HYBRID POLYESTER-POLYETHER POLYOLS

CROSS REFERENCE TO RELATED APPLICATIONS

This application is a 371 of PCT/US2011/033346 filed Apr. 21, 2011, which claims the benefit of U.S. Provisional Application Ser. No. 61/329,219, filed Apr. 29, 2010 and U.S. Provisional Application Ser. No. 61/453,152, filed Mar. 16, 2001.

BACKGROUND

1. Field of the Invention

The invention relates to processes for preparing hybrid polyester-polyether polyols from carboxyl group-containing compounds and epoxides. More particularly, it relates to processes for preparing hybrid polyester-polyether polyols optionally using one or more of a double metal cyanide catalyst, a superacid catalyst, a metal salt of a superacid catalyst, and/or a tertiary amine catalyst.

2. Background of the Art

Polyurethanes are produced in large quantities around the world. They are usually produced by reacting polyisocyanates with compounds containing at least two hydrogen atoms which are reactive toward isocyanate groups, in particular, polyether polyols and/or polyester polyols. For various applications, it is advantageous to build both ether groups and ester groups into a single polyol, in order to more conveniently and, in some instances, more economically take advantage of properties imparted by each to a final polyurethane prepared therefrom. Polyols containing both types of groups may be referred to in the industry as polyester-polyether polyols.

Although a wide variety of methods of preparing polyester-polyether polyols have been developed, many suffer from drawbacks. These drawbacks may include the presence of undesirable residual glycol in the polyol, broad polydispersity, poor yields, and required preparation temperatures greater than 150° C. There remains in the art a need for a process to prepare the hybrid polyols that reduces or eliminates these drawbacks.

SUMMARY OF THE INVENTION

In one embodiment the invention provides a process for preparing a hybrid polyester-polyether polyol comprising reacting a carboxyl group-containing component and an epoxide component, optionally in the presence of one or more of a double metal cyanide catalyst, a superacid catalyst, a metal salt of a superacid catalyst, and/or a tertiary amine catalyst, under conditions such that a hybrid polyester-polyether polyol, having, as properties induced by the reaction, a polydispersity index that is less than 1.5, an unsaturation that is less than 0.01 meq/g, and an acid number that is less than 2.0 mg/g as potassium hydroxide, is formed.

In another embodiment the invention provides a hybrid polyester-polyether polyol prepared by a process comprising reacting a carboxyl group-containing component and an epoxide component, optionally in the presence of one or more of a double metal cyanide catalyst, a superacid catalyst, a metal salt of a superacid catalyst, and/or a tertiary amine catalyst, under conditions such that a hybrid polyester-polyether polyol, having, as properties induced by the reaction, a polydispersity index that is less than 1.5, an unsaturation that is less than 0.01 meq/g, and an acid number that is less than 2.0 mg/g as potassium hydroxide, is formed.

In yet another embodiment the invention provides a polyurethane polymer prepared from a formulation comprising a hybrid polyester-polyether polyol prepared by a process wherein a carboxyl group-containing component and an epoxide component are reacted, optionally in the presence of one or more of a double metal cyanide catalyst, a superacid catalyst, a metal salt of a superacid catalyst, and/or a tertiary amine catalyst, under conditions such that a hybrid polyester-polyether polyol, having, as properties induced by the reaction, a polydispersity index that is less than 1.5, an unsaturation that is less than 0.01 meq/g, and an acid number that is less than 2.0 mg/g as potassium hydroxide, is formed.

DETAILED DESCRIPTION OF THE EMBODIMENTS

The invention provides a one- or two-step alkoxylation of a carboxyl group-containing component that results in a hybrid polyester-polyether polyol suitable for use in preparing a wide variety of polyurethane polymers or for other applications. The resulting hybrid polyester-polyether polyol may contain a reduced level of undesirable byproducts and may have a relatively low polydispersity index. Furthermore, the process may result in a relatively high yield, while processing may, in some embodiments, be carried out at temperatures below 150° C.

The primary starting material for the inventive process is a component containing at least one compound having at least one carboxyl group, —COOH (alternatively written —C(=O)OH). Such may be selected from carboxylic acid; an acidic half ester; a mixture or a reaction product of a polyol, a secondary amine or a secondary or tertiary aminoalcohol and a polycarboxylic acid anhydride; and combinations thereof. It may be, in some embodiments, a homogeneous liquid, or it may even be an inhomogeneous dispersion of a high-melting crystalline carboxyl group-containing material incorporated with a previously prepared hybrid polyester-polyether polyol (i.e., "sourdough") or incorporated with a solvent such as toluene. Suitable acids may be selected from alkanoic acids, such as formic (methanoic), acetic (ethanoic), propionic (propanoic), butyric (butanoic), valeric (pentanoic), pivalic (neopentanoic) caproic (hexanoic), enanthic (heptanoic), caprylic (octanoic), pelargonic (nonanoic) capric (decanoic), lauric (dodecanoic), myristic (tetradecanoic), palmitic (hexadecanoic), stearic (octadecanoic), arachidic (eicosanoic); fatty acids, such as docosahexanoic and eicosapentanoic acid; amino acids; keto acids, such as acetoacetic acid and pyruvic acid; aromatic acids, such as benzoic, mandelic, phthalic, trimellitic, terephthalic and salicylic; aliphatic dicarboxylic acids, such as adipic, aldaric, fumaric, glutaric, maleic, malic, malonic, oxalic, succinic, and tartronic; tricarboxylic acids, such as citric, isocitric, aconitic, and propane-1,2,3-tricarboxylic (alternatively termed tricarballylic or carballylic); alpha hydroxyl acids, such as glyceric, glycolic, lactic and tartaric; short-chain unsaturated monocarboxylic acids such as acrylic and methacrylic; halide-containing acids such as chloroacetic, dichloroacetic, trichloroacetic, and trifluoroacetic; amino acids, such as aminoethanoic, aminopropanoic, aminobutanedioic, aminopentanedioic and ethylene-diaminetetraacetic; and combinations thereof. Conveniently, the process is tolerant to high water content (up to 1 percent (%) by weight) in the starting carboxyl group-containing component.

Also suitable are natural carboxyl group-containing compounds. Such may include, for example, renewable organic feedstocks that include proteins and fats, i.e., amino acids and fatty acids, that are thermally depolymerized to include a carboxyl group-containing fraction; natural oil polyols, such as castor oil, which is primarily ricinoleic acid, and other natural oil polyols that have been oxidized or de-esterified via a variety of methods to introduce carboxyl functionality, and combinations thereof.

Other suitable carboxyl group-containing starting materials are half acid esters or half acid amides, containing at least one carboxyl group, produced from a polyol, a glycol, an alcohol, a polyhydric alcohol, a secondary or tertiary aminoalcohol, a secondary amine, a polyester polyol, a polyether-polyester polyol, or a polyether polyol, such as ethylene glycol, diethylene glycol, propylene glycol, dipropylene glycol, 1,3-propanediol, 1,4-butanediol; 1,5-pentanediol, 1,6-hexanediol, 1,4-cyclohexanedimethanol, 1,8-octanediol; neopentyl glycol; 1-3 butanediol; 2,2,4-trimethyl-1,3-pentanediol, dimethylolpropane, glycerine, trimethylolpropane, trimethylolethane, pentaerythritol, 1,2,4-butanetriol, 1,2,6-hexanetriol, erithritol, xylitol, sorbitol, adducts of sorbitol, glycerine or water with propylene oxide and/or ethylene oxide, ethanol methyl amine, 3-propanol methyl amine, 2-propanol methyl amine, bis-(2-hydroxypropyl) amine, triethanolamine, diethanolamine, N,N' dimethyl ethylenediamine, N,N' dimethyl butylene diamine, N,N' dimethyl toluenediamine, or N,N' dimethyl phenylenediamine; and polycarboxylic acid anhydrides, such as phthalic, trimellitic, maleic, succinic, itaconic, dodecenyl succinic anhydride, octadecenyl succinic anhydride, citraconic anhydride, tetrahydrophthalic anhydride, methyltetrahydrophthalic anhydride, hexahydrophthalic anhydride, alkyl hexahydrophthalic anhydrides, tetrachlorophthalic anhydride, or chlorendic anhydride. Combinations of any of these materials may also be selected as, or as part of, the carboxyl group-containing component.

The second starting material, i.e., the alkoxylation agent which is herein termed the epoxide component, may be selected from epoxide compounds, or combinations of such compounds, that are capable of reacting with a carboxyl group, —COOH, to form an alkoxo ester linkage, —COO—R—OH, wherein R is alkyl, aryl-alkyl, or an ether linkage, ROR', wherein both R and R' are independently alkyl or aryl. In certain embodiments the epoxide component is selected from ethylene oxide (EO), propylene oxide (PO), butylene oxide, 1-octene oxide, cyclohexene oxide, styrene oxide, glycidyl ether, and combinations thereof. Higher epoxides, having carbon atoms numbering, for example, from 9 to 16, may be used as well in this reaction.

The third optional material for the process of the invention is a double metal cyanide catalyst. These catalysts are often highly active, have relatively high surface areas, typically within the range of from 50 to 200 square meters per gram ($m^2/g$), and may produce polyether polyols, in particular, that have lower unsaturation when compared with otherwise similar polyols made using basic (potassium hydroxide, KOH) catalysis. The catalysts can be used to make a variety of polymer products, including polyether, polyester, and polyether-ester polyols.

In some embodiments, a DMC compound may comprise a reaction product of a water-soluble metal salt and a water-soluble metal cyanide salt. A water-soluble metal salt may have the general formula $$M(X)_n \quad \text{Formula 1}$$

in which M is a metal and X is an anion. M may be selected from Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II), and Cr(III). It may be desirable in some embodiments for M to be selected from Zn(II), Fe(II), Co(II), and Ni(II). X may be an anion selected from the group including halide, hydroxide, sulfate, carbonate, cyanide, oxalate, thiocyanate, isocyanate, isothiocyanate, carboxylate, and nitrate. The value of n may be from 1 to 3 and satisfy the valence state of M. Examples of a suitable metal salt may include, without limitation, zinc chloride, zinc bromide, zinc acetate, zinc acetonylacetonate, zinc benzoate, zinc nitrate, iron(II) sulfate, iron(II) bromide, cobalt(II) chloride, cobalt(II) thiocyanate, nickel(II) formate, nickel(II) nitrate, and combinations thereof.

A water-soluble metal cyanide salt may have the general formula $$(Y)_a M'(CN)_b(A)_c \quad \text{Formula 2}$$

in which M' may be selected from Fe(II), Fe(III), Co(II), Co(III), Cr(II), Cr(III), Mn(II), Mn(III), Ir(III), Ni(II), Rh(III), Ru(II), V(IV), V(V), and combinations thereof, and CN is cyanide. It may be desirable in some embodiments for M' to be selected from Co(II), Co(III), Fe(II), Fe(III), Cr(III), Ir(III), Ni(II), and combinations thereof. It may also be desirable that Y be an alkali metal ion or alkaline earth metal ion, while A may be an ion selected from the group consisting of halide, hydroxide, sulfate, carbonate, cyanide, oxalate, thiocyanate, isocyanate, isothiocyanate, carboxylate, and nitrate. Both a and b are integers equal to or greater than 1. In addition, the sum of the charges of a, b, and c balances the charge of M'. Examples of a suitable metal cyanide salt may include, without limitation, potassium hexacyanocobaltate(III), potassium hexacyanoferrate(II), potassium hexacyanoferrate (III), calcium hexacyanocobaltate(III), lithium hexacyanocobaltate(III), and combinations thereof.

A solid DMC catalyst that is useful for epoxide polymerizations may generally include an organic complexing agent, often of a relatively low molecular weight and often containing a heteroatom. In some non-limiting embodiments it may be desirable or necessary for a complexing agent to be soluble in water. The complexing agent may be added during preparation and/or immediately following precipitation of the catalyst, and is frequently employed in excess. Examples of some suitable complexing agents are described in greater detail in U.S. Pat. Nos. 5,158,922; 3,427,256; 3,427,334; and 3,278,459; which are incorporated herein by reference in their entireties. Such complexing agents may include alcohols, aldehydes, ketones, ethers, esters, amides, ureas, nitriles, sulfides, and combinations thereof. In alternative embodiments the complexing agent may include, without limitation, a water-soluble aliphatic alcohol selected from ethanol, isopropyl alcohol, n-butyl alcohol, isobutyl alcohol, sec-butyl alcohol, and tert-butyl alcohol, and tert-butyl alcohol may be preferred in certain applications. In another embodiment, the selected complexing agent may be an ether such as glyme (dimethoxy-ethane) or diglyme. In one conventional preparation, aqueous solutions of zinc chloride (in excess amount) and potassium hexacyanocobaltate may be combined by simple mixing. The resulting precipitate of zinc hexacyanocobaltate is then mixed with aqueous glyme. The active DMC catalyst obtained has the formula:

$$Zn_3[Co(CN)_6]_2 xZnCl_2 yH_2O zLigand \quad \text{Formula 3}$$

Double metal cyanide compounds prepared in the absence of a complexing agent are highly crystalline, as shown by X-ray diffraction analysis, and are inactive for epoxide polymerization, but may still be, along with the highly crystalline DMC compounds prepared with a complexing agent, useful in the process of the present invention. Some researchers have shown that conventional DMC catalysts include both crystalline and amorphous components. Typically, these DMC catalysts, which are generally prepared by simple mixing, still contain at least 35 weight percent (wt %) of highly crystalline DMC compound. However, there are some conventional DMC compounds, useful for epoxide polymerizations, which contain less than 30 wt % of the highly crystalline component. These may be prepared by a method wherein aqueous solutions of a water-soluble metal salt and a water-soluble metal cyanide salt are intimately combined in the presence of the complexing agent, such as is disclosed in U.S. Pat. No. 5,731,407, which is incorporated herein by reference in its entirety.

Examples of DMC compounds useful in epoxide polymerizations in general may include zinc hexacyanocobaltate(III), zinc hexacyanoferrate(III), zinc hexacyanoferrate(III), zinc hexacyanoferrate(II), nickel(II) hexacyanoferrate(II), cobalt (II) hexacyanocobaltate(III), and the like. In certain embodiments, it may be particularly desirable to use zinc hexacyanocobaltate(III). Further examples are listed in U.S. Pat. No. 5,158,922, which is incorporated herein by reference in its entirety.

In some embodiments, a solid DMC catalyst may include from 5 to 80 wt %, based on the total amount of catalyst, of a polyether. For example, it may be desirable to include from 10 to 70 wt % of the polyether. In other embodiments it may be desirable to include from 15 to about 60 wt % of the polyether.

A polyether polyol, in some embodiments, may have (e.g., an average of) from about 1 to about 8 hydroxyl functionalities. In some embodiments, a polyether polyol may have a molecular weight (e.g., a number average molecular weight) of from 200 to 10,000. A polyether polyol may be made by polymerizing an epoxide in the presence of an active hydrogen-containing initiator and a basic, Broensted acidic, or Lewis acidic catalyst (e.g., a DMC catalyst), in some embodiments. Examples of a polyether polyol may include, without limitation, poly(propylene glycol)s, poly(ethylene glycol)s, ethylene oxide-capped poly(oxypropylene) polyols, mixed ethylene oxide/propylene oxide polyols, butylene oxide polymers, butylene oxide copolymers with ethylene oxide and/or propylene oxide, polytetramethylene ether glycols, and combinations thereof. Examples of a polyether polyol may include, without limitation, tripropylene glycol, triethylene glycol, tetrapropylene glycol, tetraethylene glycol, dipropylene glycol monomethyl ether, tripropylene glycol monomethyl ether, monoalkyl and dialkyl ethers of glycols and poly (alkylene glycol)s, and combinations thereof. In some embodiments, poly(propylene glycol)s and poly(ethylene glycol)s having number average molecular weights within the range of from 150 to 500 may be used. An organic complexing agent and a polyether, according to some embodiments, may be used in a double metal cyanide catalyst.

Thus, a DMC catalyst may be fully described, in some embodiments, by the following formula:

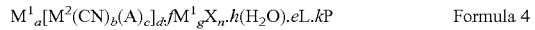   Formula 4 wherein $M^1$ is at least one metal ion selected from the group consisting of $Zn^{2+}$, $Fe^{2+}$, $Fe^{3+}$, $Co^{3+}$, $Ni^{2+}$, $Mn^{2+}$, $Co^{2+}$, $Sn^{2+}$, $Pb^{2+}$, $Mo^{4+}$, $Mo^{6+}$, $Al^{3+}$, $V^{4+}$, $V^{5+}$, $Sr^{2+}$, $W^{4+}$, $W^{6+}$, $Cr^{2+}$, $Cr^{3+}$, $Cd^{2+}$, $Hg^{2+}$, $Pd^{2+}$, $Pt^{2+}$, $V^{2+}$, $Mg^{2+}$, $Ca^{2+}$, $Ba^{2+}$, $Cu^{2+}$, $La^{3+}$, $Ce^{3+}$, $Ce^{3+}$, $Eu^{3+}$, $Ti^{3+}$, $T^{4+}$, $Ag^+$, $Rh^{3+}$, $Rh^{3+}$, $Ru^{2+}$, and $Ru^{3+}$;

$M^2$ is at least one metal ion selected from the group consisting of $Fe^{2+}$, $Fe^{3+}$, $Co^{2+}$, $Co^{3+}$, $Mn^{2+}$, $Mn^{3+}$, $V^{4+}$, $V^{5+}$, $Cr^{2+}$, $Cr^{3+}$, $Rh^{3+}$, $Ru^{2+}$, and $Ir^{3+}$;

A and X are each, independently of one another, an anion selected from the group consisting of halide, hydroxide, sulfate, carbonate, cyanide, thiocyanate, isocyanate, cyanate, carboxylate, oxalate, nitrate, nitrosyl, hydrogen sulfate, phosphate, dihydrogenphosphate, hydrogenphosphate and hydrogencarbonate;

L is a water-miscible ligand selected from the group consisting of alcohols, aldehydes, ketones, ethers, polyethers, esters, polyesters, polycarbonate, ureas, amides, primary, secondary and tertiary amines, ligands having a pyridine nitrogen, nitriles, sulfides, phosphides, phosphites, phosphanes, phosphonates and phosphates;

k is a fraction or integer greater than or equal to zero;

P is an organic additive;

a, b, c, d, g and n are selected such that the compound of Formula 4 is electrically neutral, with c being able to be 0;

e is the number of ligand molecules and is a fraction or integer equal to or greater than 0; and f and h are each, independently of one another, a fraction or integer equal to or greater than 0.

. . . preferably less than 1.8, more preferably less than 1.5, more preferably less than 1.3, and most preferably less than 1.25.

Examples of an organic additive P may include, without limitation, polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylamide-comaleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkylenimines, maleic acid and maleic anhydride copolymers, hydroxyethylcellulose, polyacetates, ionic surface-active and interface-active compounds, bile acids or their salts, esters or amides, carboxylic esters of polyhydric alcohols and glycosides. Examples of some DMC catalysts and their preparation may be found in U.S. Pat. Nos. 3,427,334; 3,941,849; 4,477,589; 5,158,922; 5,470,813; 5,482,908; and 7,348,460.

The fourth optional material for the process of the invention is a tertiary amine catalyst, which may be selected from any effective tertiary amine. Such selections such may typically include the N-alkylmorpholines, N-alkylalkanolamines, aminoalcohols, N,N-dialkylcyclohexylamines, alkylamines where the alkyl groups are methyl, ethyl, propyl, butyl and isomeric forms thereof, and heterocyclic amines. Non-limiting specific examples thereof include 1-methylimidazole, triethylenediamine, tetramethylethylenediamine, bis (2-dimethyl-aminoethyl)ether, triethanolamine, triethylamine, tripropylamine, triisoprpylamine, tributylamine, triamylamine, pyridine, quinoline, dimethylpiperazine, N,N-dimethylcyclohexyl-amine, N-ethyl-morpholine, methyltriethylene-diamine, N,N',N"-tris(dimethylaminopropyl)-sym-hexahydrotriazine, and combinations thereof. A preferred group of tertiary amines comprises 1-methyl-imidazole, 2-ethyl-4-methyl-imidazole, 2-ethylbutyldiisopropylamine, triethylenediamine, triethylamine, triisopropylamine, bis (tert-butyl)methyl amine, and combinations thereof.

In another embodiment of the present invention where a polyol that is particularly suited for preparing rigid polyurethanes is sought, a fifth material may optionally be present. This optional material is one or more superacid catalyst. Superacid catalysts are well known to those skilled in the art, for example, see U.S. Pat. Nos. 6,989,432 and 5,304,688 which are incorporated by reference herein in their entirety. Methods of measuring superacidity and the definition of a superacid as used herein are provided in the U.S. Pat. No. 5,304,688. Suitable superacid catalysts include, but are not limited to, fluorinated sulfonic acids, for example Magic acid (FSO$_3$H—SbF$_5$) and fluorosulfonic acid (HSO$_3$F), trifluoromethanesulphonic (triflic) acid (HSO$_3$CF$_3$), other perfluoroalkylsulfonic acids, fluoroantimonic acid (HSbF$_6$), carborane superacid (HCHB$_{11}$Cl$_{11}$), perchloric acid (HClO$_4$), tetrafluoroboric acid (HBF$_4$), hexafluorophosphoric acid (HPF$_6$), boron trifluoride (BF$_3$), antimony pentafluoride (SbF$_5$), phosphorous pentafluoride (PF$_5$), a sulfated metal oxyhydroxide, a sulfated metal oxysilicate, a superacid metal oxide, supported Lewis or Brønsted acids, and various zeolites and heterogeneous acid catalysts, perfluorinated ion exchange polymers (PFIEP), such as the NAFION™ PFIEP products, a family of perfluorinated sulfonic acid polymers (commercially available from E. I. du Pont de Nemours and Company, Wilmington, Del. (hereinafter, DuPont)), or a mixture thereof.

Particularly suitable superacids for use in the present invention are protic superacids. Commercially available protic superacids include trifluoromethanesulfonic acid (CF$_3$SO$_3$H), also known as triflic acid, fluorosulfonic acid (FSO$_3$H), and fluoroantimonic acid, all of which are at least a thousand times stronger than sulfuric acid. The strongest protic superacids are prepared by the combination of two components, a strong Lewis acid and a strong Brønsted acid. If used, the protic superacid may be used alone, i.e., with no other catalyst (e.g., for finishing of a batch containing unreacted alkylene oxide), or as a sole catalyst in one of the synthetic steps in a multistep synthesis, or may be used in combination with one or both a DMC catalyst and/or a tertiary amine catalyst.

For example, the catalyst combination used in the process of the present invention may be (1) a superacid and a tertiary amine catalyst, (2) a superacid and a DMC catalyst, (3) a superacid, a tertiary amine catalyst, and a DMC catalyst, or (4) one or more of a double metal cyanide catalyst, a superacid catalyst, a metal salt of a superacid catalyst where no tertiary amine is used.

A preferred protic superacid is trifluoromethanesulfonic acid.

The preferred amount of the superacid to be used depends on many factors, including the desired reaction rate, the type of polyether and carboxylic acid used, catalyst type, reaction temperature, and other considerations. Preferably, if used in the present invention, the superacid is used at catalytic in a range from 10 ppm to 10,000 ppm, based on the weight of the hybrid polyester-polyether polyol. Preferably if used the superacid is used at catalytic level below 500 ppm, preferably below 200 ppm, more preferably below 50 ppm, even more preferably below 25 ppm, based on the weight of the hybrid polyester-polyether polyol. Preferably, if used in the present invention, the superacid is used at catalytic level between 10 to 20 ppm, based on the weight of the hybrid polyester-polyether polyol. The level of superacid employed can be affected by the level of basic impurities and/or by the level of the optional DMC catalyst and/or by the level of tertiary amine catalyst, contained in the hybrid polyester-polyether polyol.

We also found that some metal salts of protic superacids are effective catalysts for the process of the invention. Thus, the salts useful in the present invention are generally derived from the protic superacids described above as suitable for use in the process. Mixtures of strong protic superacids and metal salts of the acids can be used. Preferred metal salts useful as catalysts for the process of the invention are metal salts of triflic acid, fluorosulfonic acid, and fluoroantimonic acid. Triflate salts are particularly preferred.

Preferred metal salts include metal salts of protic superacids in which the metal is selected from Group IIB, Group IB, Group IIIA, Group IVA, Group VA, and Group VIII. Thus, the metal can be, for example, zinc, copper, aluminum, tin, antimony, bismuth, iron, nickel.

Suitable metal salts include, but are not limited to, zinc triflate, copper(II) triflate, aluminum triflate, tin(II) triflate, and the like. Mixtures of metal salts can be used. Alternatively, a triflate of a heavy metal can be used, such as for example a cobalt, nickel, zirconium, tin triflate or a tetraalkylammonium triflate, for example see U.S. Pat. No. 4,543,430 which is incorporated herein by reference in its entirety.

The metal salt of a super acid is used in an amount effective to produce a hybrid polyester-polyether polyol. The quantity of metal salt employed must be sufficient to obtain the desired catalyst effect. In practice, the quantity of metal salt of a superacid employed is generally very low. The level of the metal salt of a superacid catalyst employed may be affected by the level of basic impurities and/or by the level of the optional DMC catalyst and/or by the level of tertiary amine catalyst, contained in the hybrid polyester-polyether polyol.

As with the protic superacid catalysts, the preferred amount of the metal salt of a super acid catalyst to be used depends on many factors, including the desired reaction rate, the type of polyether and carboxylic acid used, catalyst type, reaction temperature, and other factors. Preferably, if used in the present invention, the metal salt of a protic superacid is used at catalytic level in the range from 10 ppm to 10,000 ppm, based on the weight of the hybrid polyester-polyether polyol. Generally, it is preferred to use an amount of metal salt of a protic superacid at catalytic level below 500 ppm, preferably below 100 ppm, more preferably below 50 ppm, even more preferably below 25 ppm, based on the weight of the hybrid polyester-polyether polyol. Preferably, if used in the present invention, the metal salt of a protic superacid is used at catalytic level between 10 to 20 ppm, based on the weight of the hybrid polyester-polyether polyol.

A preferred metal salt of a protic superacid is aluminum triflate.

The triflates used as catalysts according to the invention may be obtained easily according to preparation processes which are well-known in themselves. In particular, the triflates of the metals listed above may be prepared by the action of triflic acid on these metals or on an oxide, hydroxide or carbonate of the said metals. The majority of the triflates possess an excellent thermal stability and do not decompose except at high temperature, usually over 300° C.

In practicing the process of the invention, it is necessary to contact the selected carboxyl group-containing component with the selected alkoxylation agent, in the presence of the selected optional DMC catalyst and/or optional tertiary amine catalyst and/or optional superacid catalyst. This contacting may be accomplished in any standard alkoxylation autoclave-type reactor, such as a stainless steel or a Pyrex double wall glass reactor. Such may be designed to enable batch, semi-batch or continuous processing, and thus desirably contains at least one, and in some embodiments two, feed and metering means, in addition to a means for adding a fresh catalyst. A means of stirring or mixing, in order to maximize contact between the catalyst, carboxyl group-containing component, and alkoxylation agent (i.e., the epoxide component), such as a stirrer, impellers, rotation capability (e.g., a rotary mixer) and a motor is desirably included. Finally, temperature and pressure control capability is desirable in order to facilitate and maximize the alkoxylation for optimal yield and quality of the final hybrid polyester-polyether.

Proportions of the starting materials may be determined by the requirements of the application for which the polyol will ultimately be used. For example, if the polyol is to be used in preparing a rigid polyurethane, it may be desirable to employ the carboxyl group-containing component and the epoxide component in amounts such that the ratio of equivalents of epoxide to equivalents of carboxylic groups ranges from 1.25:1 to 3.80:1. It is also possible to design the product polyols to have a particular type of hydroxyl functionality (primary or secondary) and/or a particular hydroxy equivalent weight (usually in the range of from 100 to 1200 Daltons (Da).

In one particular but non-limiting embodiment, it may be desirable that the starting carboxyl group-containing component contains a compound selected from natural and synthetic carboxylic acids and combinations thereof; two or more compounds that react to form a carboxyl group-containing compound; or a combination thereof. For example, these two reactive compounds may include a polycarboxylic acid anhydride and a compound selected from (polyether) polyols, secondary amines, secondary and tertiary aminoalcohols, and combinations thereof, and their reaction in situ will serve to generate the necessary carboxyl group-containing compound or compounds. Thus, in various embodiments the carboxyl group-containing component may include either (a) from 2 to 40 percent of a compound selected from natural and synthetic carboxylic acids, (polyether) polyols, secondary amines, secondary and tertiary aminoalcohols, and combinations thereof; and (b) from 2 to 85 percent of a polycarboxylic acid anhydride selected from the group consisting of aromatic, aliphatic, and araliphatic polycarboxylic acid anhydrides; or it may comprise simply (c) from 4 to 90 percent of a compound selected from natural and synthetic carboxylic acids, in the absence of any polycarboxylic acid anhydride. Either of these exemplary embodiments of the carboxyl group-containing component may be combined with an epoxide component that includes from 10 to 96 percent of an epoxide compound selected from ethylene oxide, propylene oxide, butylene oxide, 1-octene oxide, epoxides having from 9 to 16 carbon atoms, and combinations thereof, with all percentages being by weight, based on the weight of the final hybrid polyester-polyether polyol. Additional particular embodiments will be easily determined by the skilled practitioner.

A solvent that is inert to the reactants and the product, such as toluene or xylene may be included to facilitate contact between the reactants and catalyst, but may not be needed depending upon the selections of starting materials. Where included, the amount of such solvent is desirably minimized and may ranges from 10 to 50 percent (%), more desirably from 25 to 35%, based on the total weight of the carboxyl group-containing component. A solvent that is not inert to the reactants and/or the product under the reaction conditions, such as tetrahydrofuran (THF), may be copolymerized with the epoxide and incorporated into the growing polyester-polyether chains.

Conditions for the reaction may generally include a temperature ranging from 50° C. to 180° C. More desirably the temperature may range from 90° C. to 140° C., and in certain particular but non-limiting embodiments may range from 110° C. to 130° C. Pressure may range from 0.3 bar absolute (bara) to 6 bar absolute (30 to 600 kPa) and more desirably from 1 bar absolute to 4 bar absolute (100 to 400 kPa), and may include partial pressure from epoxide, nitrogen and optionally solvent. Time of the reaction may vary from 1 hour (h) to 24 h, and more desirably from 2 to 5 h, and most desirably from 2 to 3 h.

The amount of the optional DMC catalyst and/or optional superacid catalyst/metal salt of the superacid may each independently range from 10 parts per million (ppm) to 10,000 ppm, based on the total weight of the product, but such is preferably included in very minor proportion, from 10 to 100 ppm, based on the weight of the hybrid polyester-polyether polyol. An advantage of using only a very small amount of both catalysts is reduction of the total process cost. In addition, in the embodiment where no finishing process is required following production of the hybrid polyester-polyether, residual catalysts may then be left in the product without undesired problems resulting. If the optional tertiary amine catalyst is selected for use, its amount may vary from 10 to 10,000 parts per million, based on the weight of the hybrid polyester-polyether polyol.

The kinetics of the reaction are advantageous in many ways. For example, the epoxide may be fed, in a batch, continuous, or semi-continuous process, at a feed rate such that the reactor content weight is doubled each hour. In the beginning, where the process tends to be very fast and exothermic, the epoxide feed rate may be limited by the reactor's heat removal capability. Another rate-limiting factor may be the miscibility of the reagents, especially when polar hydrophilic polycarboxylic acids are being employed. The alkoxylation is desirably performed with 1 bar (100 kilopascals (kPa)) of initial nitrogen pressure present in the reactor, since this helps to minimize condensation reaction. Vacuum is desirably not applied at higher temperatures (e.g., greater than 100° C.), particularly when a slurried acidic starting material is being used, as it may in some embodiments tend to broaden the polydispersity of the product, which is generally undesirable.

Because autocatalytic alkoxylation of carboxylic acids is a second order reaction where the acid acts both as a catalytic species and a substrate, the reaction rate will vary as acid concentration rate varies, slowing down as the acid concentration decreases. If no additional catalytic species is present, the autocatalytic alkoxylation of carboxylic acids will eventually stop, as the carboxylic acid is transformed into alkoxo ester. Incomplete acid capping may eventually occur, which may result in from 1 to 10% by weight of the initial acid functionality remaining the product. The exact amount of this residual acidity depends upon the reaction time, temperature, and level of excess epoxide, but regardless of the cause, it is generally desirable to reduce the residual acid functionality in the final product as much as possible.

One way to reduce this residual acid functionality is to employ the optional tertiary amine catalyst, where a polyol that is particularly suited for preparing rigid polyurethanes is sought. The tertiary amine catalyst will serve to produce very short polyether blocks while facilitating the acid capping with the epoxide, thereby requiring less epoxide, and may reduce total needed reaction time. This will help to reduce the residual carboxylic acidity to very low levels (to below 0.5 mg/g as KOH), increasing the degree of acid capping per reacted alkylene oxide. In this variation the tertiary amine catalyst's end-batch concentration may range from 10 to 10,000 ppm, more desirably 30 to 250 ppm and in a further embodiment from 40 to 60 ppm. Temperatures in the range of from 100° C. to 140° C. have proven to be particularly effective in preparing these polyols for use in making rigid polyurethanes, higher temperatures facilitate using a minimized epoxide excess.

In contrast, if the target is to produce a polyol with a longer polyether block, the optional DMC catalyst may be employed. As the reaction proceeds and acid concentration decreases to a level of 0-50 mg/g as KOH, the DMC catalyst may eventually become active if present in sufficient amount, which enables the epoxide polymerization to continue and to effectively convert the remaining carboxylic acidity into hydroxyl functionality. The continued polymerization will increase the size of polyether block and facilitate reaching the relatively higher equivalent weights (for example, from greater than 200 Daltons (Da) to greater than 2,000 Da) that are typically sought for making flexible polyurethanes. In general the inventive process is suitable to react from 2 to 200, or more, epoxide units onto each carboxyl group of the carboxyl group-containing component, facilitating the building of molecular weight as desired.

Another process embodiment may include addition of fresh DMC catalyst in several small portions (from 15 to 50 ppm per addition, based on the weight of the initiator) to the low-acid product as the epoxide digestion progresses. The purpose of this is to ensure the most cost-effective DMC activation and avoid the progressive deactivation of the catalyst as the reaction proceeds and the epoxide is consumed. This is often particularly desirable in preparing products containing ratios of equivalents of epoxide component to equivalents of carboxyl-containing component greater than 1.8:1. It is noted that in many embodiments it is necessary to employ a ratio that is at least 2.0:1, and more desirably from 2.0:1 to 4.0:1, in order to obtain an acid level below 0.5 mg/g as KOH without subjecting the product to further process steps.

Yet another process embodiment may include addition of superacid catalyst after the autocatalytic reaction between carboxylic acid functionality of the starter and alkylene oxide has finished. This approach is particularly suited for preparing rigid polyurethanes, when it is generally required to finish off the unreacted alkylene oxide, contained in the batch at this point, without actually having to strip it off from the product. In yet another process embodiment it may be required to only slightly extend the polyether block in order to meet certain product specifications. In yet another process embodiment the superacid catalyst may be used as an intermediate catalytic solution in a multistep synthesis of a longer chain polyol from a rigid starter, in order to grow molecular weight of a polyol to make it more compatible with DMC catalyst, which may be used as a catalyst in the next step of such synthesis.

Yet another process embodiment may include the use of superacid catalyst for in situ preparation of alkoxylated initiators for hybrid polyester-polyether polyols from cheap and easily available starting materials, such as ethylene glycol, glycerine, sorbitol etc. without additional finishing of such alkoxylated initiators. Alkoxylated initiators typically have a higher molecular weight compared to the starting simple polyols, which is particularly beneficial for the process of preparing of intermediate acidic half esters, allowing the use of higher solid content slurries during the initial anhydride and polyol mixing step.

The alkoxylated initiators, prepared from simple polyols and propylene oxide with the use of superacid catalyst, have an additional advantage over the similarly constituted conventional KOH-catalyzed polyether polyols. Such superacid-catalyzed materials typically have high level of primary hydroxyls (40-60%), as opposed by the conventional KOH-catalyzed polyether polyols, where the level of primary hydroxyls almost never exceeds 10%, and is in most cases not higher than 2%. The higher level of primary hydroxyls facilitates the formation of intermediate acidic half esters in the reaction between anhydrides and polyols.

The aforementioned superacid catalyst may be used in combination with one or both a DMC catalyst and/or a tertiary amine catalyst as either independent catalyst for one of the particular steps in a multistep synthesis, or be present together with one or more catalysts mentioned above. For example, the catalyst combination used in the process of the present invention may be (1) a superacid and a tertiary amine catalyst, (2) a superacid and a DMC catalyst, or (3) a superacid, a tertiary amine catalyst, and a DMC catalyst.

For example, using the tertiary amine or the combination of the tertiary amine and optional superacid catalyst and the given temperature range may produce polyester-polyether polyols exhibiting the desirably narrow polydispersity and an acid number less than 2 mg/g as KOH, and more desirably less than 0.5 mg/g as KOH, wherein the starting equivalents ratio of epoxide component to carboxyl-containing component ranges from 1.25:1 to 1.70:1. In this embodiment it is desirable to ensure that reaction times are only just sufficient to produce the desired acid capping, since in the absence of the acid the most active sterically non-hindred tertiary amines tend to facilitate transesterification of the produced ester groups, resulting in broader polydispersities, formation of side products (mainly short-chain diols), and/or deterioration of product properties. Transesterification may be reduced by using of very low levels of the most active tertiary amines (imidazoles, below 60 ppm based on the weight of the hybrid polyester-polyol) or even completely suppressed by selecting a relatively bulky aliphatic tertiary amine, such as triisopropylamine or 2-ethylbutyl-diisopropylamine as the co-catalyst. This is because such compounds will not be easily able to induce transesterification due to their steric hindrance and, furthermore, may then deactivate in a Hofmann degradation once the carboxyl-containing component has completed reaction.

Another way of reducing the residual acidity, without using a catalyst, is to simply use an excess of epoxide, for example, a ratio of 1.8:1 to 4.0:1 of epoxide equivalents to equivalents of carboxylic acid, and increasing temperature and/or reaction time, for example, to greater than 14 h.

It is also possible to esterify any remaining carboxylic acidity in a vacuum at a higher temperature. A temperature ranging from 140° C. to 180° C. and a reaction time ranging from 2 to 8 h may result in a final acid concentration below 0.5 mg/g as KOH. This may be further enhanced by adding additional esterification catalyst, such as titanium tetra-alkoxide. However, in many embodiments this approach may be undesirable, because it tends to result in reduced functionality, broader polydispersity, and decrease overall product properties.

In another embodiment residual acidity may be reduced by employing an acid scavenger. Such will neutralize remaining carboxyl-containing component. Possible acid scavenger selections may include epoxy resins and/or amines. However, because the amount of unreacted acid may be substantial, the result may be additional, and often undesirable, byproduct formation.

Preferably, the process of the present invention does not comprise a finishing step to produce the hybrid polyester-polyether polyol product. However, in one embodiment, the process of the present invention may comprise a vacuum stripping step to remove, for example, any unreacted epoxide component and/or other volatiles. In another embodiment where no-catalyst and/or only an amine catalysis is used, a vacuum stripping step is preferred. In yet another embodiment, when a super acid catalyst is used alone, or in conjunction with one or more catalysts in the process of the present invention, optionally a neutralization step may be included. For example, when a super acid catalyst is used, an equimolar amount of KOH, $K_2CO_3$, another basic basic salt, an amine, or the like may be added to neutralize the super acid. In general, it is preferred to use a vacuum finishing step in the process of the present invention. Moreover, if a super acid catalyst is used, a neutralization step comprising the addition of an equimolar amount of a base is preferred.

The final hybrid polyester-polyether product may be colorless or vary in color, depending upon the starting carboxyl group-containing component and, when employed, the type of tertiary amine co-catalyst. It may exhibit a number of often-sought properties and offers the advantage of obtaining these properties without additional process steps, that is, the properties are "induced by," i.e., accruing to the hybrid polyester-polyether as the result of, the reaction of the inventive process. Its polydispersity index (PDI, defined as Mw/Mn, weight average molar mass/number average molar mass) may vary from 1.01 to 4.6, but is preferbly less than 1.8, more prefrably less than 1.5, more preferably less than 1.3, and most preferably less than 1.25, and is generally narrowly distributed. Other characteristics of the product may include low induced unsaturation (preferably less than or equal to 0.005 meq/g); high yield of hybrid polyester-polyether polyols (from 95 to 100%, preferably 97 to 100%, still more preferably 99 to 100% of theoretical); high primary hydroxyl products (from 30 to 50%) where the epoxide is propylene oxide (wherein the starting ratio of epoxide component equivalents to carboxyl-containing component equivalents is less than 2); low residual acidity (desirably from 0.01 to 50 mg/g as KOH, preferably less than 2 mg/g as KOH, still more preferably less than 0.5 mg/g as KOH); low induced levels of volatile byproducts, including for example cyclic esters, cyclic ethers, aldehydes and ketones (desirably less than 0.5%, more preferably less than 0.1%, and still more preferably less than 0.05%, based on weight of the product); low induced polyalkylene glycol diol formation (desirably less than 0.5%, more preferably less than 0.1%, and still more preferably less than 0.05% by weight, based on weight of the product); and/or narrow functionality distribution in the produced product (desirably less than 10%, more preferably less than 5%, and still more preferably less than 3% deviation from the target functionality).

The final hybrid polyester-polyether product may be used for a number of applications, but particularly for preparing polyurethane foams, including flexible and rigid foams for applications such as insulation for purposes such as for appliances and construction; elastomers; and adhesives. Such foams may offer improvements such as, in the case of rigid polyurethane insulation foams, greater than 25% improvement in at least one property selected from (a) increased compressive strength, and (b) reduced post-demold expansion, as compared with a rigid polyurethane insulation foam prepared from an otherwise identical formulation wherein a corresponding amount, based on hydroxyl number, of a polyester polyol is substituted for the hybrid polyester-polyether polyol.

EXAMPLES

Materials used in the examples include:
PA—Phthalic anhydride, 99.0% purity, available from Aldrich.
CA—Citric acid, greater than (>) 99.5% purity, available from Aldrich.
SA—Succinic acid (1,4-butanedioic acid), >99% purity, available from Aldrich.
DEG—Diethylene glycol (bis (2-hydroxyethyl) ether), >99.0% purity, available from The Dow Chemical Company.
DPG—Dipropylene glycol (bis (2-hydroxypropyl) ether), >99.0% purity, available from The Dow Chemical Company.
Glycerine—99.8% purity, available from Aldrich.
PO—Propylene oxide, >99.9% purity, available from The Dow Chemical Company.
EO—Ethylene oxide, >99.9% purity, available from The Dow Chemical Company.
PEG200—Polyethylene glycol with average molecular weight of 200 Da, >99.0% purity, available from The Dow Chemical Company.
VORANOL* RN 482—A sorbitol-initiated oxypropylene hexitol polyether polyol, hydroxyl number 482, available from The Dow Chemical Company.
VORANOL* RN 490—A sorbitol/glycerine-initiated oxypropylene polyether polyol with average functionality 4.3, hydroxyl number 490, available from The Dow Chemical Company.
VORANOL* RA 500—An ethylenediamine-initiated oxypropylene tetrol polyether polyol with a hydroxyl number of 500, available from The Dow Chemical Company.
VORANOL* CP1055—A glycerine-initiated oxypropylene triol polyether polyol of about 1000 molecular weight, available from The Dow Chemical Company.
VORANOL* CP1421—A glycerine-initiated oxypropylene/-oxyethylene polyether polyol (75 wt % oxyethylene), hydroxyl equivalent weight 1675, available from The Dow Chemical Company.
VORANOL* CP 6001—A glycerine-initiated oxypropylene/-oxyethylene polyether polyol, hydroxyl equivalent weight 2000, available from The Dow Chemical Company.
VORANOL* CP260—A glycerine-initiated oxypropylene triol polyether polyol of about 255 Da molecular weight, available from The Dow Chemical Company.
STEPANPOL™ PS3152—Diethylene glycol-phthalic anhydride based diol polyester polyol with a hydroxyl number of 315, available from Stepan Company.
VORANATE* M 229—A polymeric methane diphenyl diiosycanate with average functionality 2.7 and NCO content of 31% wt, available from The Dow Chemical Company.
SPECFLEX* NE 112—A blend of a polymeric and a monomeric methane diphenyl diiosycanate, available from The Dow Chemical Company.
TFA—Trifluoromethanesulfonic acid (triflic acid), >99% purity, having an $H_0$ less than −14, available from Fluka.
DABCO™ TMR30—Tris-2,4,6-dimethylamino methyl phenol, a trimerization catalyst available from Air Products and Chemicals, Inc.
DABCO™ 33 LV—A 33 wt. % solution of triethylenediamine in propylene glycol, available from Air Products and Chemicals, Inc.
PMDETA—Pentamethyldiethylenetriamine, a catalyst available from Air Products and Chemicals, Inc. under the trade name POLYCAT™ 5.
NIAX™ A-1—70% bis(2-dimethyl-aminoethyl)ether and 30% dipropylene glycol, available from Momentive Performance Materials.
DEOA—Diethanolamine, 99%, available from Aldrich.
DMCHA—N,N-dimethyl cyclohexylamine, a catalyst available from Air Products and Chemicals, Inc.
EMI—2-Ethyl-4-Methyl-Imidazole, >99.0% purity, available from Aldrich.
Cyclopentane—99% purity, a blowing agent available from Haltermann.

TEGOSTAB™ B8462—A silicone-based surfactant, available from Goldschmidt Chemical Company.

TEGOSTAB™ B 8715 LF—A silicone-based surfactant available from Goldschmidt Chemical Company.

CURITHANE* 206—Potassium acetate, 33% wt solution in diethylene glycol, a catalyst available from The Dow Chemical Company.

KLUBER™ 41-203—Mold release agent, available from Chem-Trend.

[*VORANOL, VORANATE, SPECFLEX, and CURITHANE are trademarks of The Dow Chemical Company.]

Testing is carried out according to the following methods:

Hydroxyl Number—Measured as potassium hydroxide (KOH) mg/g, according to protocol of ASTM D4274 D.

Acid Number—Measured as potassium hydroxide (KOH) mg/g according and determined by potentiometric titration of a methanolic solution of the sample with standard methanolic KOH solution (0.01 N: certified, available from Fisher Scientific).

Water % wt—Measured according to ASTM E203.

Viscosity at 25° C., 50° C., 75° C. and 100° C.: Measured according to ASTM D445 and Cone-Plate: ISO 3219.

Total Unsaturation—Measured as meq/g, according to ASTM D4671.

pH (1 $H_2O$+10 MeOH)—Apparent pH, measured using a standard pH meter after addition of 10 g of sample to 60 mL of a neutralized water-methanol (1+10 water+methanol by weight) solution.

Molecular Weight Distribution—The Molecular Weight Distribution (MWD) of the samples is determined by means of room temperature gel permeation chromatography (GPC). The GPC system is calibrated against a standard polyol mixture of VORANOL* CP6001+VORANOL* CP4100+VORANOL* CP2000+VORANOL* CP1000 (triol glycerine based polypropylene polyols having Mn=6000, 4100, 2000, and 1000 Da). Calculation is based on the narrow standard method.

NMR—$^{13}C$ NMR spectra are recorded on a Bruker DPX-400 device, with the following working frequencies: 400.13 MHz for $^1H$ and 100.62 MHz for $^{13}C$. Polyol samples for $^{13}C$ NMR are measured in 10 mm NMR tubes in $d_6$-acetone. The samples are prepared by mixing of 3 g of polyol and 1 g of solvent. Inverse gated proton decoupled $^{13}C$-NMR spectra (relaxation time T1=10 seconds, 1024 scans) and DEPT135 spectra are acquired.

Catalyst Preparation

A DMC catalyst is synthesized by adding, in a three-necked, round-bottomed flask 11.1 grams (g) (0.033 mol) $K_3Co(CN)_6$, 453 g (25.17 mol) $H_2O$, and 58.5 g (0.789 mol) t-butanol and stirring at more than 200 revolutions per minute (rpm) for 30 min at 30° C. A mixture of 114 g (0.836 mol) $ZnCl_2$ and 114 g (6.33 mol) water ($H_2O$) is then added at a rate of 5 milliliters per minute (mL/min). Temperature is maintained within a maximum range of ±4° C. during mixing to avoid a drop in activity. Stirring is continued for 30 more min. The result, a milk-like dispersion, is centrifuged at 10,000 rpm for 30 min. The precipitate is washed for 30 min in a mix of 153 g (2.06 mol) t-butanol and 84 g (4.67 mol) $H_2O$, under vigorous stirring, prior to centrifugation at 10,000 rpm for 30 min. The second wash is a repeat of the first, but the amount of t-butanol and $H_2O$ are altered to 214 g (2.89 mol) and 1.5 g (0.083 mol), respectively. Following centrifugation the precipitate is dried for 16 h at 20-30 millibars (mbar) (2-3 kPa) at 50° C. The product is then milled in a mortar to break up any agglomerates, and the catalyst, approximately 15 g, is obtained as a fine white powder.

The catalyst is then analyzed for the metals cobalt, potassium, and zinc using X-Ray Fluorescence (XRF) and Inductively Coupled Plasma Emission Spectrometry (ICP-ES) in an aqua regia digest. The elemental composition is found to be as follows: Potassium, 0.31 wt %; zinc, 25.2 wt %; cobalt, 11.1028 wt %; potassium/cobalt, 0.028 wt %; and water, 7.0489 wt %.

Example 1

623.4 g (6.77 mol) glycerine and 1503.9 g (10.15 mol) phthalic anhydride are mixed in 5 L stainless steel alkoxylation reactor. The reaction mixture is flushed 10 times with 6 bar (600 kPa) nitrogen ($N_2$) pressure without stirring. The reactor is thermostated at 120° C. with 6 bar of $N_2$ pressure. Initially the solid reactor content gradually dissolves in the reactor, becoming mainly liquid after 0.5 h at this temperature. Stirring is switched on, gradually increasing the stirring rate from 50 to 200 rpm. The reactor content is stirred for an additional 1.5 h. The $N_2$ pressure in the reactor is reduced to 1.0 bar, and the stirring rate is increased to 400 rpm. PO (1651 g, 28.43 mol) is fed to the reactor at a feed rate of 15 g/min over 110 min. The immediate reaction start is accompanied by a strong exotherm. At completion of feed the total pressure in the reactor has reached 5.1 bar (510 kPa). The reactor temperature is increased to 130° C. and 14.5 h of additional digestion time is allowed. The total pressure in the reactor decreases to 3.4 bar (340 kPa). Residual pressure is vented off. The reaction mixture is flushed 10 times with 6 bar (600 kPa) $N_2$ pressure. The product is stripped in vacuum for 2 h at 100° C. A colorless viscous liquid is obtained.

The produced hybrid polyester-polyether polyol has the following properties: OH value: 308 mg KOH/g; Acid number: 1.7 mg KOH/g; Total unsaturation: 0.0047 meq/g; Water: 40 ppm; Total volatiles 216 ppm; Viscosity at 50° C.: 5260 mPa·s; Viscosity at 75° C.: 569 mPa·s; Viscosity at 100° C.: 119 mPa·s; Density at 60° C.: 1.168 g/cm³; pH: 4.4. $^{13}C$-NMR: Glycerine+1.5 PA+4.0 PO, Mn=548 Da; Primary OH: 41.3% of total OH, Secondary OH: 58.7% of total OH. GPC: Mn=380 g/mol, Mw/Mn=1.13.

Example 2

307.4 g (3.34 mol) glycerine and 741.6 g (5.01 mol) phthalic anhydride are mixed in 5 L stainless steel alkoxylation reactor. The reaction mixture is flushed 10 times with 6 bar (600 kPa) nitrogen ($N_2$) pressure without stirring. The reactor is thermostated at 120° C. with 6 bar (600 kPa) of $N_2$ pressure. Initially the solid reactor content gradually dissolves in the reactor, becoming mainly liquid after 0.5 h at this temperature. Stirring is switched on, gradually increasing stirring rate from 50 to 200 rpm. The reactor content is stirred for an additional 1.5 h. The $N_2$ pressure in the reactor is reduced to 1.0 bar (100 kPa). A DMC catalyst (1.549 g, 800 ppm based on the weight of the product) is added to the reactor. The reaction mixture is flushed 10 times with 6 bar (600 kPa) $N_2$ pressure. The stirring rate is increased to 400 rpm and the reactor temperature is increased to 130° C. PO (887 g, 15.27 mol) is fed to the reactor at a feed rate of 15 g/min over a time period of 60 min. The immediate reaction start is accompanied by a strong exotherm. At completion of the feed the reactor has reached 5.8 bar (580 kPa). At 110 min from the start of the PO feed, a sudden drop of pressure in the reactor, accompanied by an exotherm, both typical of DMC catalyst activation, is observed. An additional 0.5 h of digestion time is allowed. The product is stripped in vacuum for 1 h at 100° C. A colorless viscous liquid is obtained.

The produced hybrid polyester-polyether polyol has the following properties: OH value: 289 mg KOH/g; Acid number: 0.3 mg KOH/g; Total unsaturation: 0.0052 meq/g; Water: 90 ppm; Total volatiles 96 ppm; Viscosity at 50° C.: 3920 mPa·s; Viscosity at 75° C.: 429 mPa·s; Viscosity at 100° C.: 89 mPa·s; Density at 60° C.: 1.159 g/cm$^3$; pH: 6.4; $^{13}$C-NMR: Glycerine+1.5 PA+4.6 PO, Mn=580 Da; Primary OH: 35.5% of total OH, Secondary OH: 64.5% of total OH. GPC: Mn=400 g/mol, Mw/Mn=1.13.

Example 3

650.0 g (6.13 mol) diethylene glycol, 1814.5 g (12.25 mol) phthalic anhydride and a DMC catalyst (0.036 g, 10 ppm based on the weight of the product) are mixed in 5 L stainless steel alkoxylation reactor. The reaction mixture is flushed 10 times with 6 bar (600 kPa) nitrogen ($N_2$) pressure without stiffing. The reactor is thermostated at 110° C. with 6 bar (600 kPa) of $N_2$ pressure. Initially the solid reactor content gradually dissolves in the reactor, becoming mainly liquid after 0.5 h at this temperature. Stiffing is switched on, gradually increasing stiffing rate from 50 to 200 rpm. The reactor content is stirred for an additional 1.5 h. The $N_2$ pressure in the reactor is reduced to 1.0 bar (100 kPa). The stiffing rate is increased to 400 rpm and the reactor temperature is increased to 120° C. PO (1189 g, 20.47 mol) is fed to the reactor at a feed rate of 15 g/min over a period of 60 min. The immediate reaction start is accompanied by a strong exotherm. Upon completion of feed the total pressure in the reactor has reached 4.8 bar (480 kPa). 6 h of additional digestion time is allowed. The total pressure in the reactor decreases to 2.3 bar (230 kPa). Residual pressure is vented off and the reaction mixture is flushed 10 times with 6 bar (600 kPa) $N_2$ pressure. The product is stripped in vacuum for 1 h at 100° C. A colorless viscous liquid is obtained.

The produced hybrid polyester-polyether polyol has the following properties: OH value: 177 mg KOH/g; Acid number: 18.4 mg KOH/g; Total unsaturation: 0.002 meq/g; Water: 720 ppm; Total volatiles 52 ppm; Viscosity at 50° C.: 4273 mPa·s; Viscosity at 75° C.: 1220 mPa·s; Viscosity at 100° C.: 105 mPa·s; Density at 60° C.: 1.183 g/cm$^3$; pH: 3.6; $^{13}$C-NMR: DEG+2.0 PA+3.2 PO, Mn=587 Da; Primary OH: 41% of total OH, Secondary OH: 59% of total OH. GPC: Mn=360 g/mol, Mw/Mn=1.17.

Example 4

2368.8 g of the polyol from Example 3 is placed in a 5 L stainless steel alkoxylation reactor. The reactor is thermostated at 120° C.

DMC Catalyst Activation Step: A DMC catalyst (0.059 g, 25 ppm based on the weight of starter) is added to the reactor. The reaction mixture is flushed 10 times with 6 bar (600 kPa) $N_2$ pressure with stirring. Vacuum is applied to the reactor to bring pressure inside to <1 mbar (0.1 kPa). PO (200 g, 3.44 mol) is fed to the reactor at a feed rate of 15 g/min over a period of 14 min. Reactor content is stirred for 1 h. No DMC catalyst activation is observed. Residual pressure is vented off and the reaction mixture is flushed 10 times with 6 bar (600 kPa) $N_2$ pressure, followed by vacuum stripping for 10 min.

The DMC catalyst activation step is repeated two times, as described above. A sudden drop of pressure in the reactor, accompanied by an exotherm, both of which are typical of DMC catalyst activation, is observed within 10 min following upon the completion of the third DMC catalyst activation step. An additional 0.5 h of digestion time is allowed. The product is stripped in vacuum for 1 h at 100° C. A colorless viscous liquid is obtained.

The produced hybrid polyester-polyether polyol has the following properties: OH value: 174 mg KOH/g; Acid number: 1.3 mg KOH/g; Total unsaturation: 0.002 meq/g; Water: 230 ppm; Total volatiles 59 ppm; Viscosity at 50° C.: 2054 mPa·s; Viscosity at 75° C.: 860 mPa·s; Viscosity at 100° C.: 76 mPa·s; Density at 25° C.: 1.190 g/cm$^3$; pH: 5.1; $^{13}$C-NMR: DEG+2.0 PA+4.4 PO, Mn=660 Da; Primary OH: 30% of total OH, Secondary OH: 70% of total OH. GPC: Mn=443 g/mol, Mw/Mn=1.12.

Example 5

3812.8 g (35.93 mol) diethylene glycol and 10643.7 g (71.86 mol) phthalic anhydride are mixed in a 20 L stainless steel alkoxylation reactor. The reaction mixture is flushed 10 times with 6 bar (600 kPa) $N_2$ pressure without stirring. Reactor is thermostated at 120° C. with 6 bar (600 kPa) of $N_2$ pressure. Initially the solid reactor content gradually dissolves in the reactor, becoming mainly liquid after 0.5 h at this temperature. Stirring is switched on, gradually increasing stirring rate from 50 to 200 rpm. Reactor content is stirred for an additional 1.5 h. Reactor temperature is increased to 130° C. The $N_2$ pressure in the reactor is reduced to 1.0 bar (100 kPa). PO (7336 g, 126.31 mol) is fed to the reactor at a feed rate of 95 g/min over a period of 80 min. The immediate reaction start is accompanied by a strong exotherm. Upon completion of feed the total pressure in the reactor has reached 5.7 bar (570 kPa). An additional 10 h of digestion time is allowed. The total pressure in the reactor decreases to 3.1 bar (310 kPa).

Solid DMC catalyst (3.34 g) is dispersed in 520.0 g of the polyol from Example 4, using an IKA Ultra Turrax T25 blender at 14000 rpm for 15 min in a dry bag. The dispersion contains 6500 ppm of the DMC catalyst. Reactor is thermostated at 120° C. 89.8 g of the DMC catalyst dispersion, prepared as described above, is injected into the reactor with the help of a pressurized stainless steel bomb, connected to the reactor, followed by feed of an additional 1240 g of PO at a feed rate of 95 g/min. Reactor content is stirred for 2 h. No DMC catalyst activation is observed.

Additional 87.4 g of the DMC catalyst dispersion is injected into the reactor, followed by feed of an additional 700 g of PO at 95 g/min. Reactor content is stirred for an additional 2 h. No catalyst activation is observed.

An additional 83.4 g of the DMC catalyst dispersion is injected into the reactor, followed by feed of an additional 500 g of PO at 95 g/min. Smooth DMC catalyst activation, accompanied by a pressure drop in the reactor and an exotherm, is observed within 10 min following completion of the feed. An additional 0.5 h of digestion time is allowed. The product is stripped in vacuum for 1 h at 100° C. A colorless viscous liquid is obtained.

The produced hybrid polyester-polyether polyol has the following properties: OH value: 169 mg KOH/g; Acid number: 0.16 mg KOH/g; Total unsaturation: 0.006 meq/g; Water: 130 ppm; Total volatiles 88 ppm; Viscosity at 50° C.: 1430 mPa·s; Viscosity at 75° C.: 225 mPa·s; Viscosity at 100° C.: 65 mPa·s; Density at 60° C.: 1.143 g/cm$^3$; pH: 7.6; $^{13}$C-NMR: DEG+2.0 PA+4.8 PO, Mn=680 Da; Primary OH: 23% of total OH, Secondary OH: 77% of total OH. GPC: Mn=460 g/mol, Mw/Mn=1.12.

Example 6

14249.2 g of the polyol from Example 5, containing activated DMC catalyst, is placed in a 20 L stainless steel alkoxylation reactor. The reactor is thermostated at 135° C. Vacuum is applied to the reactor to bring pressure inside to <1 mbar (0.1 kPa). PO (6511 g, 112.10 mol) is fed to the reactor at a feed rate of 90 g/min over a period of 75 min. During this feed the pressure in the reactor is maintained at 1.0 bar (100 kPa). An additional 0.5 hour of digestion time is allowed. The product is stripped in vacuum for 1 h at 100° C. A colorless viscous liquid is obtained.

The produced hybrid polyester-polyether polyol has the following properties: OH value: 116 mg KOH/g; Acid number: 0.1 mg KOH/g; Total unsaturation: 0.006 meq/g; Water: 160 ppm; Total volatiles 160 ppm; Viscosity at 50° C.: 507 mPa·s; Viscosity at 75° C.: 113 mPa·s; Viscosity at 100° C.: 36 mPa·s; Density at 25° C.: 1.122 g/cm$^3$; pH: 7.9' $^{13}$C-NMR: DEG+2.0 PA+10.1 PO, Mn=991 Da; Primary OH: 6.3% of total OH, Secondary OH: 93.7% of total OH. GPC: Mn=780 g/mol, Mw/Mn=1.08.

Example 7

920.0 g (8.67 mol) diethylene glycol, 2568.2 g (17.34 mol) phthalic anhydride, DMC catalyst (0.076 g, 15 ppm based on the weight of the product) and 2-ethyl-4-methyl imidazole (1.02 g, 200 ppm based on the weight of the product) are mixed in a 5 L stainless steel alkoxylation reactor. The reaction mixture is flushed 10 times with 6 bar (600 kPa) N2 pressure without stirring. Reactor is thermostated at 110° C. with 6 bar (600 kPa) of N2 pressure. Initially the solid reactor content gradually dissolves in the reactor, becoming mainly liquid after 0.5 h at this temperature. Stirring is switched on, gradually increasing stirring rate from 50 to 200 rpm. Reactor content is stirred for an additional 1.5 h. The N2 pressure in the reactor is reduced to 1.0 bar (100 kPa) and the stiffing rate is increased to 400 rpm. PO (1581 g, 27.22 mol) is fed to the reactor at a feed rate of 15 g/min over a period of 105 min. The immediate reaction start is accompanied by a strong exotherm. Upon completion of the feed total pressure in the reactor has reached 5.3 bar (530 kPa). An additional 2 h of digestion time is allowed. The total pressure in the reactor decreases to 4.0 bar (400 kPa). Residual pressure is vented off and the reaction mixture is flushed 10 times with 6 bar (600 kPa) N2 pressure. The product is stripped in vacuum for 1 h at 100° C. A colorless viscous liquid is obtained.

The produced hybrid polyester-polyether polyol has the following properties: OH value: 205 mg KOH/g; Acid number: 0.6 mg KOH/g; Total unsaturation: 0.005 meq/g; Water: 350 ppm; Total volatiles 72 ppm; Viscosity at 50° C.: 3390 mPa·s; Viscosity at 75° C.: 385 mPa·s; Viscosity at 100° C.: 76 mPa·s; Density at 25° C.: 1.197 g/cm$^3$; pH: 5.5; $^{13}$C-NMR: DEG+2.0 PA+2.7 PO, Mn=560 Da; Primary OH: 39% of total OH, Secondary OH: 61% of total OH. GPC: Mn=680 g/mol, Mw/Mn=1.06.

Example 8

1199.5 g (11.30 mol) diethylene glycol, 2525.8 g (17.05 mol) phthalic anhydride and 2-ethyl-4-methyl imidazole (0.27 g, 50 ppm based on the weight of the product) are mixed in a 5 L stainless steel alkoxylation reactor. Reaction mixture is flushed 10 times with 6 bar (600 kPa) N$_2$ pressure without stiffing. Reactor is thermostated at 110° C. with 6 bar (600 kPa) of N$_2$ pressure. Initially the solid reactor content gradually dissolves in the reactor, becoming mainly liquid after 0.5 h at this temperature. Stirring is switched on, gradually increasing the stirring rate from 50 to 200 rpm. Reactor content is stirred for an additional 1.5 h. The N$_2$ pressure in the reactor is reduced to 1.0 bar (100 kPa). Stirring rate is increased to 400 rpm and the reactor temperature is increased to 130° C. PO (1998 g, 34.40 mol) is fed to the reactor at a feed rate of 12.5 g/min over a period of 160 min. The immediate reaction start is accompanied by an exotherm. Upon completion of the feed the total pressure in the reactor has reached 5.7 bar (570 kPa). An additional 2 h of digestion time is allowed. The total pressure in the reactor decreases to 4.9 bar (490 kPa). Residual pressure is vented off and the reaction mixture is flushed 10 times with 6 bar (600 kPa) N$_2$ pressure. The product is stripped in vacuum for 1 h at 120° C. A colorless viscous liquid is obtained.

The produced hybrid polyester-polyether polyol has the following properties: OH value: 238 mg KOH/g; Acid number: 0.3 mg KOH/g; Total unsaturation: 0.0013 meq/g; Water: 130 ppm; Total volatiles 95 ppm; Viscosity at 50° C.: 1070 mPa·s; Viscosity at 75° C.: 153 mPa·s; Viscosity at 100° C.: 51 mPa·s; Density at 60° C.: 1.179 g/cm$^3$; pH: 5.5; $^{13}$C-NMR: DEG+1.5 PA+2.5 PO, Mn=474 Da; Primary OH: 49% of total OH, Secondary OH: 51% of total OH. GPC: Mn=330 g/mol, Mw/Mn=1.12.

Example 9

204.4 g (1.93 mol) diethylene glycol, 285.3 g (1.93 mol) phthalic anhydride and 2-ethyl-butyl-diisopropyl amine (0.96 g, 1400 ppm based on the weight of the product) are mixed in a 5 L stainless steel alkoxylation reactor. Reaction mixture is flushed 10 times with 6 bar (600 kPa) N$_2$ pressure without stiffing. Reactor is thermostated at 110° C. with 6 bar (600 kPa) of N$_2$ pressure. Initially the solid reactor content gradually dissolves in the reactor, becoming mainly liquid after 0.5 h at this temperature. Stirring is switched on, gradually increasing the stirring rate from 50 to 200 rpm. Reactor content is stirred for an additional 1.5 h. The N$_2$ pressure in the reactor is reduced to 1.0 bar (100 kPa). Stirring rate is increased to 400 rpm and the reactor temperature is increased to 130° C. PO (198 g, 3.41 mol) is fed to the reactor at a feed rate of 15 g/min over a period of 15 min. The immediate reaction start is accompanied by an exotherm. Upon completion of the feed the total pressure in the reactor has reached 5.1 bar (510 kPa). An additional 5.5 h of digestion time is allowed. The total pressure in the reactor decreases to 4.2 bar (420 kPa). Residual pressure is vented off and the reaction mixture is flushed 10 times with 6 bar (600 kPa) N$_2$ pressure. The product is stripped in vacuum for 0.5 h at 120° C. A colorless viscous liquid is obtained.

The produced hybrid polyester-polyether polyol has the following properties: OH value: 314 mg KOH/g; Acid number: 0.4 mg KOH/g; Total unsaturation: 0.0011 meq/g; Water: 100 ppm; Total volatiles 76 ppm; Viscosity at 50° C.: 393 mPa·s; Viscosity at 75° C.: 75 mPa·s; Viscosity at 100° C.: 25 mPa·s; Density at 60° C.: 1.172 g/cm$^3$; pH: 5.2; $^{13}$C-NMR: DEG+1.0 PA+1.6 PO, Mn=348 Da; Primary OH: 59% of total OH, Secondary OH: 41% of total OH. GPC: Mn=280 g/mol, Mw/Mn=1.08.

Example 10

600.0 g (3.12 mol) anhydrous citric acid, a DMC catalyst (0.059 g, 40 ppm based on the weight of the product) and 1500 g toluene are mixed in a 20 L stainless steel alkoxylation reactor. Reaction mixture is flushed 10 times with 6 bar (600 kPa) N$_2$ pressure. Reactor is thermostated at 125° C. with 1 bar (100 kPa) of N$_2$ pressure and stirring at 200 rpm. PO (1310 g, 22.55 mol) is fed to the reactor at a feed rate of 13 g/min over a period of 100 min. Upon completion of the feed the total pressure in the reactor has reached 4.8 bar (480 kPa). An additional 2.5 h of digestion time is allowed. The reactor is then cooled to 30° C. and the product is collected into a plastic container. The solvent is removed on a rotary evaporator at 60° C. and 50-10 mbar (5-1 kPa), and then at 90° C. and 1 mbar (0.1 kPa). A colorless viscous liquid is obtained.

The produced hybrid polyester-polyether polyol has the following properties: OH value: 447 mg KOH/g; Acid number: 0.8 mg KOH/g; Total unsaturation: 0.004 meq/g; Water: 160 ppm; Viscosity at 50° C.: 2070 mPa·s; pH: 6.3; $^{13}$C-NMR: CA+5.2 PO, Mn=494 Da; Primary OH: 30.5% of total OH, Secondary OH: 45.7% of total OH, Tertiary OH 23.8% of total OH. GPC: Mn=362 g/mol, Mw/Mn=1.17.

Example 11

1226.5 g of the polyol from Example 10 is placed in a 5 L stainless steel alkoxylation reactor. Reactor is thermostated at 120° C.

DMC Catalyst Activation Step: A DMC catalyst (0.053 g, 43 ppm based on the weight of starter) is added to the reactor. Reaction mixture is flushed 10 times with 6 bar (600 kPa) N2 pressure with stiffing. Vacuum is applied to the reactor to bring pressure inside to <1 mbar (0.1 kPa). PO (200 g, 3.44 mol) is fed to the reactor at a feed rate of 15 g/min over a period of 14 min. Reactor content is stirred for 1 h. No DMC catalyst activation is observed. Residual pressure is vented off and the reaction mixture is flushed 10 times with 6 bar (600 kPa) $N_2$ pressure, followed by vacuum stripping for 10 min.

The DMC catalyst activation step is repeated two times, as described above. A slow drop of pressure in the reactor is observed over a period of 1 h upon the end of the third DMC catalyst activation step. Additional PO (500 g, 8.61 mol) is fed to the reactor at a feed rate of 15 g/min over a period of 35 min. An additional 1 h of digestion time is allowed. The product is stripped in vacuum for 1 h at 100° C. A colorless viscous liquid is obtained.

The produced hybrid polyester-polyether polyol has the following properties: OH value: 262 mg KOH/g; Acid number: 0.3 mg KOH/g; Total unsaturation: 0.004 meq/g; Water: 100 ppm; Viscosity at 25° C.: 5750 mPa·s; Viscosity at 50° C.: 622 mPa·s; pH: 8.0; $^{13}$C-NMR: CA+11.2 PO, Mn=843 Da; Primary OH: 12.5% of total OH, Secondary OH: 65.0% of total OH, Tertiary OH 22.5% of total OH. GPC: Mn=830 g/mol, Mw/Mn=1.38.

Example 12

570.0 g (2.97 mol) anhydrous citric acid, a DMC catalyst (0.100 g, 65 ppm based on the weight of the product) and 540 g toluene are mixed in a 5 L stainless steel alkoxylation reactor. Reaction mixture is flushed 10 times with 6 bar (600 kPa) $N_2$ pressure. Reactor is thermostated at 120° C. with 1 bar (100 kPa) $N_2$ pressure and stiffing at 200 rpm. EO (1110 g, 25.20 mol) is fed to the reactor at a feed rate of 15 g/min over a period of 75 min. Upon completion of the feed the total pressure in the reactor has reached 5.6 bar (560 kPa). An additional 12 h of digestion time is allowed. The reactor is then cooled to 30° C. and the product is collected into a plastic container. The solvent is removed on a rotary evaporator at 60° C. and 50-10 mbar (5-1 kPa) and then at 90° C. and 1 mbar (0.1 kPa). A colorless viscous liquid is obtained.

The produced hybrid polyester-polyether polyol has the following properties: OH value: 430 mg KOH/g; Acid number: 1.0 mg KOH/g; Total unsaturation: 0.001 meq/g; Water: 340 ppm; pH: 6.3. $^{13}$C-NMR: CA+7.3 EO, Mn=515 Da; Primary OH: 76% of total OH, Tertiary OH 24% of total OH. GPC: Mn=355 g/mol, Mw/Mn=1.20.

Example 13

1052.3 g of the polyol from the Example 12 and DMC catalyst (0.842 g, 500 ppm based on the weight of the product) are mixed in 5 L stainless steel alkoxylation reactor. The reaction mixture is flushed 10 times with 6 bar (600 kPa) nitrogen (N2) pressure with stiffing. Reactor is thermostated at 120° C. with 1.6 bar N2 pressure. EO (150 g, 3.40 mol) is fed to the reactor at the feed rate of 15 g/min over a period of 10 min. A drop of pressure in the reactor is observed within 15 min following completion of the feed. Additional EO (482 g, 10.94 mol) is fed to the reactor at a feed rate of 15 g/min over a period of 35 min. Additional digestion time of 0.5 h is allowed. The product is stripped in vacuum for 1 h at 100° C. A colorless viscous liquid is obtained.

The produced hybrid polyester-polyether polyol has the following properties: OH value: 265 mg KOH/g; Acid number: 0.2 mg KOH/g; Total unsaturation: 0.004 meq/g; Water: 270 ppm; Viscosity at 25° C.: 8950 mPa·s; Viscosity at 40° C.: 5600 mPa·s; pH: 8.5. $^{13}$C-NMR: CA+14.3 EO, Mn=824 Da; Primary OH: 77.5% of total OH, Tertiary OH 22.5% of total OH. GPC: Mn=756 g/mol, Mw/Mn=3.69.

Example 14

500.0 g (4.24 mol) succinic acid, a DMC catalyst (0.103 g, 95 ppm based on the weight of the product) and 500 g toluene are mixed in a 5 L stainless steel alkoxylation reactor. The reaction mixture is flushed 10 times with 6 bar (600 kPa) $N_2$ pressure. Reactor is thermostated at 140° C. with 1 bar (100 kPa) of $N_2$ pressure and stiffing at 200 rpm. PO (600 g, 10.33 mol) is fed to the reactor at a feed rate of 15 g/min over a period of 40 min. Upon completion of the feed the total pressure in the reactor has reached 4.8 bar (480 kPa). An additional 6.0 h of digestion time is allowed. The reactor is then cooled to 30° C. and the product is collected into a plastic container. The solvent is removed on a rotary evaporator at 60° C. and 50-10 mbar (5-1 kPa), and then at 90° C. and 1 mbar (0.1 kPa). A colorless viscous liquid is obtained.

The produced hybrid polyester-polyether polyol has the following properties: OH value: 305 mg KOH/g; Acid number: 7.9 mg KOH/g; Total unsaturation: 0.003 meq/g; Water: 40 ppm; Viscosity at 25° C.: 917 mPa·s; pH: 4.7; $^{13}$C-NMR: SA+2.4 PO, Mn=255 Da; Primary OH: 40.0% of total OH, Secondary OH: 60.0% of total OH.

Example 15

800.0 g (8.69 mol) glycerine and 1286.6 g (8.69 mol) phthalic anhydride are mixed in 5 L stainless steel alkoxylation reactor. The reaction mixture is flushed 10 times with 6 bar (600 kPa) nitrogen ($N_2$) pressure without stirring. The reactor is thermostated at 110° C. with 6 bar of $N_2$ pressure. Initially the solid reactor content gradually dissolves in the reactor, becoming mainly liquid after 0.5 h at this temperature. Stirring is switched on, gradually increasing the stirring rate from 50 to 200 rpm. The reactor content is stirred for an additional 1.5 h. The reactor temperature is increased to 130° C. The $N_2$ pressure in the reactor is reduced to 1.0 bar, and the stiffing rate is increased to 400 rpm. PO (1917.0 g, 33.00 mol) is fed to the reactor at a feed rate of 15 g/min over 130 min. The immediate reaction start is accompanied by an exotherm. At the completion of the feed the total pressure in the reactor has reached 6 bar (600 kPa). 2.5 h of additional digestion time is allowed. The total pressure in the reactor decreases to 5.0 bar (500 kPa). The reactor temperature is decreased to 100° C. 1.00 g of a 10% solution of triflic acid (20 ppm TFA based on the weight of product) in ethanol is injected into the reactor with the help of a pressurized stainless steel bomb, connected to the reactor. Immediate pressure drop in the reactor and an exotherm are observed. An additional 10 min of digestion time is allowed. Additional PO (643.0 g, 11.08 mol) is fed to the reactor at a feed rate of 15 g/min over 45 min. The immediate reaction start is accompanied by an exotherm. Upon the end of this feed, 15 min of additional digestion time is allowed. Residual nitrogen pressure is vented off, the reaction mixture is flushed 10 times with 6 bar (600 kPa) $N_2$ pressure. Potassium carbonate (0.05 g, 0.36 mmol) added to the product in order to neutralize the remaining triflic acid. The product is then stripped in vacuum for 2 h at 100° C. A colorless viscous liquid is obtained.

The produced hybrid polyester-polyether polyol has the following properties: OH value: 310 mg KOH/g; Acid number: 1.1 mg KOH/g; Total unsaturation: 0.0056 meq/g; Water: 180 ppm; Total volatiles 560 ppm; Viscosity at 25° C.: 10800 mPa·s; Viscosity at 50° C.: 835 mPa·s; Viscosity at 75° C.: 122 mPa·s; Viscosity at 100° C.: 36 mPa·s; Density at 60° C.: 1.118 g/cm$^3$; Density at 25° C.: 1.146 g/cm$^3$; pH: 4.7. $^{13}$C-NMR: Glycerine+1.0 PA+5.2 PO, Mn=541 Da; Primary OH: 61.6% of total OH, Secondary OH: 37.9% of total OH. GPC: Mn=330 g/mol, Mw/Mn=1.21.

Example 16

190.9 g (2.07 mol) glycerine and 307.1 g (2.07 mol) phthalic anhydride are mixed in 5 L stainless steel alkoxylation reactor. The reaction mixture is flushed 10 times with 6 bar (600 kPa) nitrogen ($N_2$) pressure without stiffing. The reactor is thermostated at 110° C. with 6 bar of $N_2$ pressure. Initially the solid reactor content gradually dissolves in the reactor, becoming mainly liquid after 0.5 h at this temperature. Stirring is switched on, gradually increasing the stiffing rate from 50 to 200 rpm. The reactor content is stirred for an additional 1.5 h. The reactor temperature is decreased to 100° C. 0.55 g of a 10% solution of triflic acid (50 ppm TFA based on the weight of product) in ethanol is injected into the reactor with the help of a pressurized stainless steel bomb, connected to the reactor. The $N_2$ pressure in the reactor is reduced to 1.0 bar, and the stiffing rate is increased to 400 rpm. PO (610.5 g, 10.51 mol) is fed to the reactor at a feed rate of 15 g/min over 40 min. The immediate reaction start is accompanied by a strong exotherm. At the completion of the feed the total pressure in the reactor has reached 3.0 bar (300 kPa). Upon the end of the feed, 30 min of additional digestion time is allowed. The total pressure in the reactor decreases to 1.4 bar (140 kPa). Potassium carbonate (0.03 g, 0.22 mmol) added to the product in order to neutralize the remaining triflic acid. The product is then stripped in vacuum for 2 h at 100° C. A colorless viscous liquid is obtained.

The produced hybrid polyester-polyether polyol has the following properties: OH value: 243 mg KOH/g; Acid number: 48 mg KOH/g; Total unsaturation: 0.006 meq/g; Water: 120 ppm; Total volatiles 329 ppm; Viscosity at 50° C.: 1820 mPa·s; Viscosity at 75° C.: 280 mPa·s; Viscosity at 100° C.: 83 mPa·s; Density at 60° C.: 1.124 g/cm$^3$; Density at 25° C.: 1.151 g/cm$^3$; pH: 3.5. $^{13}$C-NMR: Glycerine+1.0 PA+4.7 PO, Mn=514 Da; Primary OH: 63.2% of total OH, Secondary OH: 36.8% of total OH. GPC: Mn=330 g/mol, Mw/Mn=1.39.

Example 17

2000.0 g (7.84 mol) of VORANOL* CP260 triol polyether polyol, 1161.7 g (7.84 mol) phthalic anhydride and 0.21 g of 2-Ethyl-4-Methyl-Imidazole (50 ppm EMI based on the weight of product) are mixed in 5 L stainless steel alkoxylation reactor. The reaction mixture is flushed 10 times with 6 bar (600 kPa) nitrogen ($N_2$) pressure without stirring. The reactor is thermostated at 130° C. with 6 bar of $N_2$ pressure. Initially the solid reactor content gradually dissolves in the reactor, becoming mainly liquid after 0.5 h at this temperature. Stirring is switched on, gradually increasing the stirring rate from 50 to 200 rpm. The reactor content is stirred for an additional 1.5 h. The $N_2$ pressure in the reactor is reduced to 1.0 bar, and the stirring rate is increased to 400 rpm. PO (1048.6 g, 18.06 mol) is fed to the reactor at a feed rate of 15 g/min over 70 min. The immediate reaction start is accompanied by an exotherm. At the completion of the feed the total pressure in the reactor has reached 5.7 bar (570 kPa). 2.5 h of additional digestion time is allowed. The total pressure in the reactor decreases to 4.2 bar (420 kPa). The reactor temperature is decreased to 100° C. 6.10 g of a 10% solution of triflic acid (145 ppm TFA based on the weight of product) in ethanol is injected into the reactor with the help of a pressurized stainless steel bomb, connected to the reactor. Immediate pressure drop in the reactor and an exotherm are observed. Upon the end of this feed, 40 min of additional digestion time is allowed. Residual nitrogen pressure is vented off, the reaction mixture is flushed 10 times with 6 bar (600 kPa) $N_2$ pressure. Potassium carbonate (0.28 g, 2.03 mmol) added to the product in order to neutralize the remaining triflic acid. The product is then stripped in vacuum for 2 h at 100° C. A colorless viscous liquid is obtained.

The produced hybrid polyester-polyether polyol has the following properties: OH value: 307 mg KOH/g; Acid number: 0.2 mg KOH/g; Total unsaturation: 0.0031 meq/g; Water: 70 ppm; Total volatiles 286 ppm; Viscosity at 50° C.: 954 mPa·s; Viscosity at 75° C.: 154 mPa·s; Viscosity at 100° C.: 47 mPa·s; Density at 60° C.: 1.116 g/cm$^3$; Density at 25° C.: 1.143 g/cm$^3$; pH: 5.8. $^{13}$C-NMR: Glycerine+2.8 PO+1.0 PA+2.3 PO, Mn=536 Da; Primary OH: 34.3% of total OH, Secondary OH: 65.7% of total OH. GPC: Mn=380 g/mol, Mw/Mn=1.18.

Example 18

500.0 g (1.96 mol) of VORANOL* CP260 triol polyether polyol, 435.7 g (2.94 mol) phthalic anhydride and 0.07 g of 2-Ethyl-4-Methyl-Imidazole (50 ppm EMI based on the weight of product) are mixed in 5 L stainless steel alkoxylation reactor. The reaction mixture is flushed 10 times with 6 bar (600 kPa) nitrogen ($N_2$) pressure without stirring. The reactor is thermostated at 130° C. with 6 bar of $N_2$ pressure. Initially the solid reactor content gradually dissolves in the reactor, becoming mainly liquid after 0.5 h at this temperature. Stirring is switched on, gradually increasing the stirring rate from 50 to 200 rpm. The reactor content is stirred for an additional 1.5 h. The $N_2$ pressure in the reactor is reduced to 1.0 bar, and the stirring rate is increased to 400 rpm. PO (358.7 g, 6.18 mol) is fed to the reactor at a feed rate of 15 g/min over 25 min. The immediate reaction start is accompanied by an exotherm. At the completion of the feed the total pressure in the reactor has reached 5.2 bar (520 kPa). 2.5 h of additional digestion time is allowed. The total pressure in the reactor decreases to 3.2 bar (420 kPa). The reactor temperature is decreased to 100° C. 1.90 g of a 10% solution of triflic acid (145 ppm TFA based on the weight of product) in ethanol is injected into the reactor with the help of a pressurized stainless steel bomb, connected to the reactor. Immediate pressure drop in the reactor and an exotherm are observed. Upon the end of this feed, 30 min of additional digestion time is allowed. Residual nitrogen pressure is vented off, the reaction mixture is flushed 10 times with 6 bar (600 kPa) $N_2$ pressure. Potassium carbonate (0.09 g, 0.65 mmol) added to the product in order to neutralize the remaining triflic acid. The product is then stripped in vacuum for 2 h at 100° C. A colorless viscous liquid is obtained.

The produced hybrid polyester-polyether polyol has the following properties: OH value: 249 mg KOH/g; Acid number: 0.7 mg KOH/g; Total unsaturation: 0.0022 meq/g; Water: 120 ppm; Total volatiles 98 ppm; Viscosity at 50° C.: 2520 mPa·s; Viscosity at 75° C.: 316 mPa·s; Viscosity at 100° C.: 87 mPa·s; Density at 60° C.: 1.134 g/cm³; Density at 25° C.: 1.159 g/cm³; pH: 4.8. $^{13}$C-NMR: Glycerine+2.8 PO+1.5 PA+3.2 PO, Mn=662 Da; Primary OH: 38.4% of total OH, Secondary OH: 61.6% of total OH. GPC: Mn=500 g/mol, Mw/Mn=1.20.

Example 19

300.0 g (3.26 mol) glycerine and 0.21 g of a 10% solution of triflic acid (10 ppm TFA based on the weight of product) in ethanol are placed in 5 L stainless steel alkoxylation reactor. The reactor is closed and thermostated at 100° C. with 1 bar of $N_2$ pressure with 200 rpm stiffing. Vacuum is applied to the reactor to lower down the pressure inside to below 1 mbar. Stirring rate is increased to 400 rpm and PO (410.5 g, 7.07 mol) is fed to the reactor at a feed rate of 15 g/min over 30 min. The immediate reaction start is accompanied by a strong exotherm. Upon the end of this feed, 10 min of additional digestion time is allowed. Reactor is flushed 10 times with 6 bar (600 kPa) nitrogen ($N_2$) pressure without stiffing. 723.9 g (4.89 mol) phthalic anhydride and 0.12 g of 2-Ethyl-4-Methyl-Imidazole (60 ppm EMI based on the weight of product) are added to the reactor. The reaction mixture is flushed 10 times with 6 bar (600 kPa) nitrogen ($N_2$) pressure without stirring. The reactor is thermostated at 130° C. with 6 bar of $N_2$ pressure. Initially the solid reactor content gradually dissolves in the reactor, becoming mainly liquid after 0.5 h at this temperature. Stirring is switched on, gradually increasing the stirring rate from 50 to 200 rpm. The reactor content is stirred for an additional 1.5 h. The $N_2$ pressure in the reactor is reduced to 1.0 bar, and the stirring rate is increased to 400 rpm. PO (596.7 g, 10.27 mol) is fed to the reactor at a feed rate of 15 g/min over 40 min. The immediate reaction start is accompanied by an exotherm. At the completion of the feed the total pressure in the reactor has reached 4.4 bar (440 kPa). 2.5 h of additional digestion time is allowed. The total pressure in the reactor decreases to 2.5 bar (250 kPa). The reactor temperature is decreased to 100° C. 2.85 g of a 10% solution of triflic acid (140 ppm TFA based on the weight of product) in ethanol is injected into the reactor with the help of a pressurized stainless steel bomb, connected to the reactor. Immediate pressure drop in the reactor and an exotherm are observed. Upon the end of this feed, 15 min of additional digestion time is allowed. Residual nitrogen pressure is vented off, the reaction mixture is flushed 10 times with 6 bar (600 kPa) $N_2$ pressure. Potassium carbonate (0.13 g, 0.94 mmol) added to the product in order to neutralize the remaining triflic acid. The product is then stripped in vacuum for 2 h at 100° C. A colorless viscous liquid is obtained.

The produced hybrid polyester-polyether polyol has the following properties: OH value: 258 mg KOH/g; Acid number: 0.9 mg KOH/g; Total unsaturation: 0.0011 meq/g; Water: 340 ppm; Total volatiles 183 ppm; Viscosity at 50° C.: 2750 mPa·s; Viscosity at 75° C.: 332 mPa·s; Viscosity at 100° C.: 87 mPa·s; Density at 60° C.: 1.142 g/cm³; Density at 25° C.: 1.169 g/cm³; pH: 4.4. $^{13}$C-NMR: Glycerine+2.2 PO+1.5 PA+3.1 PO, Mn=621 Da; Primary OH: 49.5% of total OH, Secondary OH: 50.5% of total OH. GPC: Mn=440 g/mol, Mw/Mn=1.23.

Example 20

590.8 g (4.40 mol) DPG and 0.71 g of a 10% solution of triflic acid (18 ppm TFA based on the weight of product) in ethanol are placed in 5 L stainless steel alkoxylation reactor. The reactor is closed and thermostated at 100° C. with 1 bar of $N_2$ pressure with 200 rpm stiffing. The reactor content is stripped in vacuum for 0.5 h at 100° C. Vacuum line is closed, stirring rate is increased to 400 rpm and PO (511.5 g, 8.81 mol) is fed to the reactor at a feed rate of 15 g/min over 35 min. The immediate reaction start is accompanied by a strong exotherm. Upon the end of this feed, 0.5 h of additional digestion time is allowed. Stirring rate is decreased to 50 rpm. Reactor is flushed 10 times with 6 bar (600 kPa) nitrogen ($N_2$) pressure. 1305.3 g (8.81 mol) phthalic anhydride and 0.04 g (0.29 mmol) $K_2CO_3$ are added to the reactor. The reaction mixture is flushed 10 times with 6 bar (600 kPa) nitrogen ($N_2$) pressure. The reactor is thermostated at 100° C. with 6 bar of $N_2$ pressure with 50 rpm stiffing. Initially the solid reactor content gradually dissolves in the reactor, becoming mainly liquid after 0.5 h at this temperature. Stiffing rate is gradually increased from 50 to 100 rpm. The reactor content is stirred for an additional 16 h. The $N_2$ pressure in the reactor is reduced to 1.0 bar, temperature is increased to 130° C. and the stiffing rate is increased to 400 rpm. PO (1074.3 g, 18.50 mol) is fed to the reactor at a feed rate of 11 g/min over 100 min. The immediate reaction start is accompanied by an exotherm. At the completion of the feed the total pressure in the reactor has reached 4.9 bar (490 kPa). 4.5 h of additional digestion time is allowed. The total pressure in the reactor decreases to 2.7 bar (270 kPa). A 468.0 g sample is taken with help of vacuumized steel bomb, connected to the bottom valve of the reactor. The sample is transferred into a glass flask and stripped off unreacted PO in vacuum with stirring for 0.5 h at 100° C.

Solid DMC catalyst (0.753 g) is dispersed in 270.0 g of the polyol taken from the stripped sample, as described above, using an IKA Ultra Turrax T25 blender at 14000 rpm for 15 min in a dry bag. The dispersion contains 2780 ppm of the DMC catalyst. Reactor is thermostated at 140° C. 84.8 g of the DMC catalyst dispersion, prepared as described above, is injected into the reactor with the help of a pressurized stainless steel bomb, connected to the reactor, followed by feed of an additional 100 g of PO at a feed rate of 30 g/min. Reactor content is stirred for 1.0 h. No DMC catalyst activation is observed.

Additional 82.4 g of the DMC catalyst dispersion is injected into the reactor, followed by feed of an additional 100 g of PO at 30 g/min. Reactor content is stirred for an additional 1.0 h. No catalyst activation is observed.

An additional 84.8 g of the DMC catalyst dispersion is injected into the reactor, followed by feed of an additional 100 g of PO at 30 g/min. Smooth DMC catalyst activation, accompanied by a pressure drop in the reactor and an exotherm, is observed within 20 min following completion of the feed. An additional 66 g of PO are fed to the reactor at 30 g/min. An additional 1.0 h of digestion time is allowed. The product is stripped in vacuum for 1 h at 120° C. A colorless viscous liquid is obtained.

The produced hybrid polyester-polyether polyol has the following properties: OH value: 136 mg KOH/g; Acid number: 0.6 mg KOH/g; Total unsaturation: 0.006 meq/g; Water: 260 ppm; Total volatiles 280 ppm; Viscosity at 25° C.: 12800 mPa·s; Viscosity at 50° C.: 1010 mPa·s; Viscosity at 75° C.: 144 mPa·s; Viscosity at 100° C.: 35 mPa·s; Density at 60° C.: 1.100 g/cm$^3$; Density at 25° C.: 1.129 g/cm$^3$; $^{13}$C-NMR: DPG+2.0 PA+7.5 PO, Mn=866 Da; Primary OH: 23.3% of total OH, Secondary OH: 76.7% of total OH; GPC: Mn=610 g/mol, Mw/Mn=1.18.

Example 21

306.7 g (3.33 mol) glycerine and 493.3 g (3.33 mol) phthalic anhydride are mixed in 5 L stainless steel alkoxylation reactor. The reaction mixture is flushed 10 times with 6 bar (600 kPa) nitrogen (N$_2$) pressure without stiffing. The reactor is thermostated at 110° C. with 6 bar of N$_2$ pressure. Initially the solid reactor content gradually dissolves in the reactor, becoming mainly liquid after 0.5 h at this temperature. Stirring is switched on, gradually increasing the stiffing rate from 50 to 200 rpm. The reactor content is stirred for an additional 1.5 h. The reactor temperature is increased to 130° C. The N$_2$ pressure in the reactor is reduced to 1.0 bar, and the stiffing rate is increased to 400 rpm. PO (773.7 g, 13.32 mol) is fed to the reactor at a feed rate of 10 g/min over 80 min. The immediate reaction start is accompanied by an exotherm. At the completion of the feed the total pressure in the reactor has reached 4.8 bar (480 kPa). 5.0 h of additional digestion time is allowed. The total pressure in the reactor decreases to 4.0 bar (400 kPa). The reactor temperature is decreased to 100° C. 0.36 g of a 10% solution of triflic acid (9 ppm TFA based on the weight of product) in ethanol is injected into the reactor with the help of a pressurized stainless steel bomb, connected to the reactor. Immediate pressure drop in the reactor and an exotherm are observed. An additional 10 min of digestion time is allowed. Additional PO (208.0 g, 3.58 mol) is fed to the reactor at a feed rate of 10 g/min over 25 min. The immediate reaction start is accompanied by an exotherm. Upon the end of this feed, 15 min of additional digestion time is allowed. Residual nitrogen pressure is vented off, the reaction mixture is flushed 10 times with 6 bar (600 kPa) N$_2$ pressure. Potassium hydroxide (0.40 g, 0.5 mol/l solution in ethanol) is injected into the reactor with the help of a pressurized stainless steel bomb, connected to the reactor, in order to neutralize the remaining triflic acid. The product is then stripped in vacuum for 2 h at 120° C. A colorless viscous liquid is obtained.

A DMC catalyst (0.204 g, 50 ppm based on the weight of product)) is added to the reactor. The reaction mixture is flushed 10 times with 6 bar (600 kPa) N$_2$ pressure with stiffing. Vacuum is applied to the reactor to bring pressure inside to <1 mbar (0.1 kPa). Temperature is increased to 140° C. PO (200.0 g, 3.44 mol) is fed to the reactor at a feed rate of 20 g/min over a period of 10 min with 300 rpm stiffing. A sudden drop of pressure in the reactor, accompanied by an exotherm, both of which are typical of DMC catalyst activation, is observed within 10 min following upon the completion of the PO feed. An additional amount of PO (2105.0 g, 36.24 mol) is fed to the reactor at a feed rate of 20 g/min over a period of 110 min. An additional 0.5 h of digestion time is allowed. A colorless viscous liquid is obtained.

The produced hybrid polyester-polyether polyol has the following properties: OH value: 133 mg KOH/g; Acid number: 0.1 mg KOH/g; Total unsaturation: 0.0029 meq/g; Water: 190 ppm; Total volatiles 160 ppm; Viscosity at 25° C.: 970 mPa·s; Viscosity at 50° C.: 186 mPa·s; Viscosity at 75° C.: 51 mPa·s; Viscosity at 100° C.: 14 mPa·s; Density at 60° C.: 1.029 g/cm$^3$; Density at 25° C.: 1.056 g/cm$^3$; pH: 6.1. $^{13}$C-NMR: Glycerine+1.0 PA+17.2 PO, Mn=1240 Da; Primary OH: 7.1% of total OH, Secondary OH: 92.9% of total OH. GPC: Mn=1030 g/mol, Mw/Mn=1.11.

Comparative Example A and Example 22

Foaming Procedure and Foam Properties Characterization

Foam samples are prepared using high pressure injection machines and dispensing equipment from Afros-Cannon. The formulated polyols and blowing agent are premixed. The formulated polyol, blowing agent and isocyanate are processed on a high pressure injection machine at a temperature of 20±2° C. using a mix pressure of 150±20 bar (15000±2000 kPa). The isocyanate index is kept constant at 1.15 for all the foam samples prepared. The foam samples are evaluated for reactivity, flow, density distribution, compressive strength, thermal conductivity and demolding properties. Properties are determined according to the following protocols:

(1) Reactivity and free rise density: A free rise box foam is prepared to measure the reactivity of the formulation and the Free Rise Density (FRD) of the foam. The cream time, the string time and the tack free time are recorded during the foam rise. The FRD is measured 24 h after foaming.

(2) Foam physical properties: The foam physical properties are evaluated using a Brett mold (200×20×5 cubic centimeters (cm$^3$)) filled at a 45° angle and immediately raised to the vertical position. The mold is maintained at 45° C. The minimum fill density (MFD) is determined and panels at 110% and 115% over-packing (OP) are produced. The over-pack is defined as the Molded Density (MD) divided by the MFD. MD is calculated from the mass of the Brett panel divided by its volume. The system flow is measured by the flow index (FI; FI=MFD/FRD). The average density deviation (ADD) is calculated based on the density of 15 specimens cut along the Brett.

(3) Thermal conductivity (Lambda): Thermal conductivity measurements are carried out with LaserComp Fox 200 equipment at an average temperature of 10.2° C.

(4) Compressive strength: The compressive strength is measured according to ISO 844 on 5 specimens along the Brett.

(5) Demolding properties: Demolding properties are determined with a Jumbo Mold (70×40×10 cm$^3$) maintained at 45° C. Jumbo panels produced with an overpack factor (OP) level of 115% are demolded at 6 min, plus 3 min curing time, and 7 min, plus 3 min curing time. The post expansion of the foam is measured 24 h after demold. A cube mold of 20×20×20 cm$^3$ is also used. The cubic mold is demolded after 3 min, plus 5 min curing time is allowed. An OP level of 115% is applied and post-expansion is also measured 24 h after demold.

Two rigid polyurethane foams are prepared using the components and proportions shown in Table 1. One foam includes 20.0 parts by weight (pbw) of STEPANPOL™ PS3152 polyester polyol, and the other foam includes, instead, the same amount of the hybrid polyester-polyether prepared in Example 7, diluted with 10% by weight of PEG200. (Since the hydroxyl number of the hybrid polyester-polyether polyol is lower than that of the STEPANPOL™ PS3152 polyester polyol, the hybrid polyester-polyether is diluted with 10% by weight of PEG200 to reach the same hydroxyl number as the STEPANPOL™ PS3152 polyester polyol.) The foams are then tested for various properties and the results shown in Table 2.

TABLE 1

| Component | pbw |
|---|---|
| VORANOL ™ RN 482 | 54.2 |
| VORANOL ™ RN 490 | 6.7 |
| 100% STEPANPOL ™ PS3152 Polyester Polyol or 90% Hybrid Polyester-Polyether Polyol from Example 7/10% PEG200 | 20.0 |
| VORANOL ™ CP 1055 | 8.5 |
| VORANOL ™ RA 500 | 4.0 |
| TEGOSTAB ™ B 8462 | 1.8 |
| PMDETA | 0.4 |
| DMCHA | 0.9 |
| CURITHANE ™ 206 | 0.3 |
| DABCO ™ TMR30 | 0.8 |
| Water | 2.4 |
| Cyclopentane | 14 |
| VORANATE ™ M229 | 146 |

The results shown in Table 2 illustrate the improvements in demolding properties and hydrocarbon compatibility of the formulation, while maintaining compressive strength and thermal conductivity. These improvements enable productivity and processability increase at the manufacturer.

TABLE 2

| Polyol | Comparative Example A<br>100% STEPANPOL ™ PS3152 Polyester Polyol | Example 22<br>90% Hybrid Polyester-Polyether Polyol from Example 7/10% PEG200 |
|---|---|---|
| Gel Time (seconds) | 42 | 45 |
| Tack-Free Time (seconds) | 56 | 75 |
| Free Rise Density 24 h (kg/m³) | 20.7 | 21.0 |
| Brett - Sample 1 | | |
| Minimum Fill Density (kg/m³) | 28.9 | 28.9 |
| Flow Index 24 h | 1.398 | 1.375 |
| Average Density Deviation | 1.53 | 1.40 |
| Molded Density (kg/m³) | 31.9 | 32.0 |
| Overpack Factor (%) | 110.4 | 110.8 |
| Compressive Strength (kPa) | 92 | 94 |
| Compressive Strength (kPa) (corrected 32 kg/m³ density) | 93 | 94 |
| Brett - Sample 2 | | |
| Minimum Fill Density (kg/m³) | 28.9 | 28.9 |
| Flow Index 24 h | 1.398 | 1.375 |
| Average Density Deviation | 1.93 | 1.22 |
| Molded Density (kg/m³) | 33.4 | 33.2 |
| Overpack Factor (%) | 115.6 | 115.1 |
| Compressive Strength (kPa) | 108 | 107 |
| Compressive Strength (kPa) (corrected for 32 kg/m³ density) | 100 | 100 |
| Lambda Value at 10° C. (mW/mK) | | |
| Overpack Factor (%): 110 | 19.56 | 19.59 |
| Overpack Factor (%): 115 | 19.67 | 19.80 |
| Jumbo Mold | | |
| Overpack Factor (%) | 115.1 | 115.5 |
| Molded Density (kg/m³) | 33.22 | 33.35 |
| Expansion 6 min (mm) | 10.0 | 6.0 |
| Corrected Expansion 6 min (mm) | 10.0 | 5.8 |
| Overpack Factor (%) | 115.1 | 114.9 |
| Molded density (kg/m³) | 33.23 | 33.18 |
| Expansion 7 min (mm) | 9.4 | 5.2 |
| Corrected Expansion 7 min (mm) | 9.3 | 5.2 |
| Blowing agent separation at 24 h | complete | little |

Comparative Example B and Example 23

Foaming Procedure and Foam Properties Characterization

A flexible polyurethane foam is prepared from the formulation shown in Table 3, using 2.00 parts by weight of the hybrid polyester-polyether polyol of Example 14. A second foam is prepared using identical procedures and conditions, except that it does not contain any of the hybrid polyester-polyether polyol of Example 14.

The reactants are mixed in a plastic cup using a stirrer at 2,000 RPM for 5 seconds, then poured into a 300×300×100 mm aluminum mold, heated at 60° C., equipped with vent-holes. The mold is pre-treated with a mold release agent KLUBER™ 41-2038. The resulting foam properties are measured according to ASTM 3574-03. Compression set reported in % CD means that the thickness loss of the samples is compared to that of the samples under compression. Compression Force at 50% Deflection (CFD) is measured according to the Peugeot D-41-1003 test method.

The results shown in Table 4 show that the addition of the hybrid polyester-polyether polyol as a chain extender improves foam tensile strength and elongation at break, while maintaining other physical properties, especially compression sets. This is important for diphenylmethane diisocyanate (MDI) based flexible foams.

TABLE 3

| Formulation | Comparative Example B | Example 23 |
|---|---|---|
| Voranol CP 6001 (pbw) | 100 | 100 |
| Voranol CP 1421 (pbw) | 2 | 2 |
| Hybrid Polyester-Polyether or Polyol from Example 14 (pbw) | n/a | 2 |
| Water (pbw) | 3.5 | 3.5 |
| Diethanolamine (pbw) | 0.5 | 0.5 |
| Niax A-1 (pbw) | 0.05 | 0.05 |
| Dabco 33 LV (pbw) | 0.4 | 0.4 |
| Tegostab B 8715 LF (pbw) | 1.5 | 1.5 |
| Specflex NE 112 (pbw) | 95 | 95 |
| Demolding time (min) | 6 | 6 |
| Mold temperature (° C.) | 60 | 60 | n/a indicates not applicable

TABLE 4

| Property | Comparative Example B | Example 23 |
|---|---|---|
| Core Density (kg/m³) | 49.2 | 48.5 |
| 50% Compression Force Deflection (kPa) | 7.7 | 7.3 |
| Tensile strength (kPa) | 69 | 101 |
| Elongation (%) | 75 | 103 |
| Airflow (cubic feet per minute) | 2.0 | 2.6 |
| 50% Compression Set (% CD) | 9 | 9.2 |
| 75% Compression Set (% CD) | 8 | 9.4 |

The invention claimed is:

1. A process for preparing a hybrid polyester-polyether polyol comprising
reacting a carboxyl group-containing component and an epoxide component selected from ethylene oxide (EO), propylene oxide (PO), butylene oxide, 1-octene oxide, cyclohexene oxide, or styrene oxide, in the presence of one or more of a superacid catalyst and/or a metal salt of a superacid catalyst, a tertiary amine catalyst selected from the group consisting of 2-ethylbutyldiisopropyl amine, triisopropylamine, bis(tert-butyl)methyl amine, and combinations thereof, and optionally a double metal cyanide catalyst, under conditions such that a hybrid polyester-polyether polyol, having, as properties induced by the reaction, a polydispersity index that is less than 1.5, an unsaturation that is less than 0.01 meq/g, and an acid number that is less than 2.0 mg/g as potassium hydroxide, is formed, wherein the superacid catalyst and/or the metal salt of a superacid catalyst is present in an amount ranging from 10 to 10,000 parts per million, based on the weight of the hybrid polyester-polyether polyol, and polydispersity index is defined as the weight average molar mass/number average molar mass ratio as determined by gel permeation chromatography, unsaturation is determined according to ASTM D4671, and acid number is measured as potassium hydroxide mg/g according and determined by potentiometric titration of a methanolic solution of the sample with standard methanolic KOH solution.

2. The process of claim 1, wherein the polydispersity index is less than 1.3.

3. The process of claim 1, wherein the carboxyl group-containing component is selected from a carboxylic acid; an acidic half ester; a mixture or a reaction product of a polyether polyol, a secondary amine or a secondary or tertiary aminoalcohol, and a polycarboxylic acid anhydride; or a combination thereof.

4. The process of claim 1, wherein the double metal cyanide catalyst is present in an amount from 10 to 10,000 parts per million, based on the weight of the hybrid polyester-polyether polyol.

5. The process of claim 1, wherein the super acid catalyst is trifluoromethanesulfonic acid.

6. The process of claim 1, wherein the hybrid polyester-polyether polyol component includes either (a) and (b) or (c):
 (a) from 2 to 40 percent of a compound selected from natural and synthetic carboxylic acids, (polyether) polyols, secondary amines, secondary and tertiary aminoalcohols, and combinations thereof; and
 (b) from 2 to 85 percent of a polycarboxylic acid anhydride selected from the group consisting of aromatic, aliphatic, and araliphatic polycarboxylic acid anhydrides; or
 (c) from 4 to 90 percent of a compound selected from natural and synthetic carboxylic acids, in the absence of the polycarboxylic acid anhydride;
and
from 10 to 96 percent of the epoxide compound; all percentages being by weight, based on the weight of the hybrid polyester-polyether polyol.

7. A hybrid polyester-polyether polyol formed by the process of claim 1.

8. A polyurethane polymer prepared from a formulation comprising the hybrid polyester-polyether polyol of claim 1.

* * * * *